(12) United States Patent
Xu et al.

(10) Patent No.: US 10,124,250 B2
(45) Date of Patent: Nov. 13, 2018

(54) GAMING SYSTEM, KIT, AND METHOD FOR ENABLING INTERACTIVE PLAY

(71) Applicants: Tao Xu, Westmont, IL (US); Ying Li, Shenzhen (CN); Xiaojun Zhang, Shenzhen (CN); Linzhi Fang, Huizou (CN)

(72) Inventors: Tao Xu, Westmont, IL (US); Ying Li, Shenzhen (CN); Xiaojun Zhang, Shenzhen (CN); Linzhi Fang, Huizou (CN)

( * ) Notice: Subject to any disclaimer, the term of this patent is extended or adjusted under 35 U.S.C. 154(b) by 16 days.

(21) Appl. No.: 15/600,746

(22) Filed: May 21, 2017

(65) Prior Publication Data

US 2018/0071622 A1 Mar. 15, 2018

Related U.S. Application Data

(63) Continuation-in-part of application No. 15/265,642, filed on Sep. 14, 2016.

(51) Int. Cl.
*A63F 13/24* (2014.01)
*A63F 13/211* (2014.01)

(52) U.S. Cl.
CPC ............ *A63F 13/24* (2014.09); *A63F 13/211* (2014.09); *A63F 2250/52* (2013.01); *A63F 2300/8017* (2013.01)

(58) Field of Classification Search
CPC ....... A63F 13/211; A63F 13/235; A63H 30/04
See application file for complete search history.

(56) References Cited

U.S. PATENT DOCUMENTS

| | | | |
|---|---|---|---|
| 2004/0080494 | A1 | 4/2004 | Fahlman |
| 2008/0215679 | A1* | 9/2008 | Gillo .................... A63F 13/31 709/204 |
| 2010/0331087 | A1 | 12/2010 | Argenter |
| 2011/0221674 | A1 | 9/2011 | Jenssen |
| 2015/0199026 | A1 | 7/2015 | Cook et al. |
| 2015/0346781 | A1 | 12/2015 | Tokutake |

\* cited by examiner

*Primary Examiner* — Dmitry Suhol
*Assistant Examiner* — Ankit Doshi
(74) *Attorney, Agent, or Firm* — Christopher J. Scott

(57) ABSTRACT

A gaming system, kit and attendant methodology provide users with overlapping real-virtual world interactive play. The gaming kit enables a user's smart phone or tablet type computer to enable virtual gaming upon the visual display thereof. A user-operable control device separate from the computer includes externally ornamental circuitry housing and signal-transmitting circuitry. The user-operable control device generates and transmits virtual object control signals enabled via the signal-transmitting circuitry. A signal-communicating mechanism receives virtual object control signals from the control device and communicates the virtual object control signals to the user's computer. A computer-implementable gaming application is deployable via the computer for providing a controllable and visually displayed virtual object upon the electronic visual display. The virtual object is virtually controllable in a gaming environment by way of the control signals sent from the user-operable control device and communicated to the computer via the signal-communicating mechanism.

15 Claims, 16 Drawing Sheets

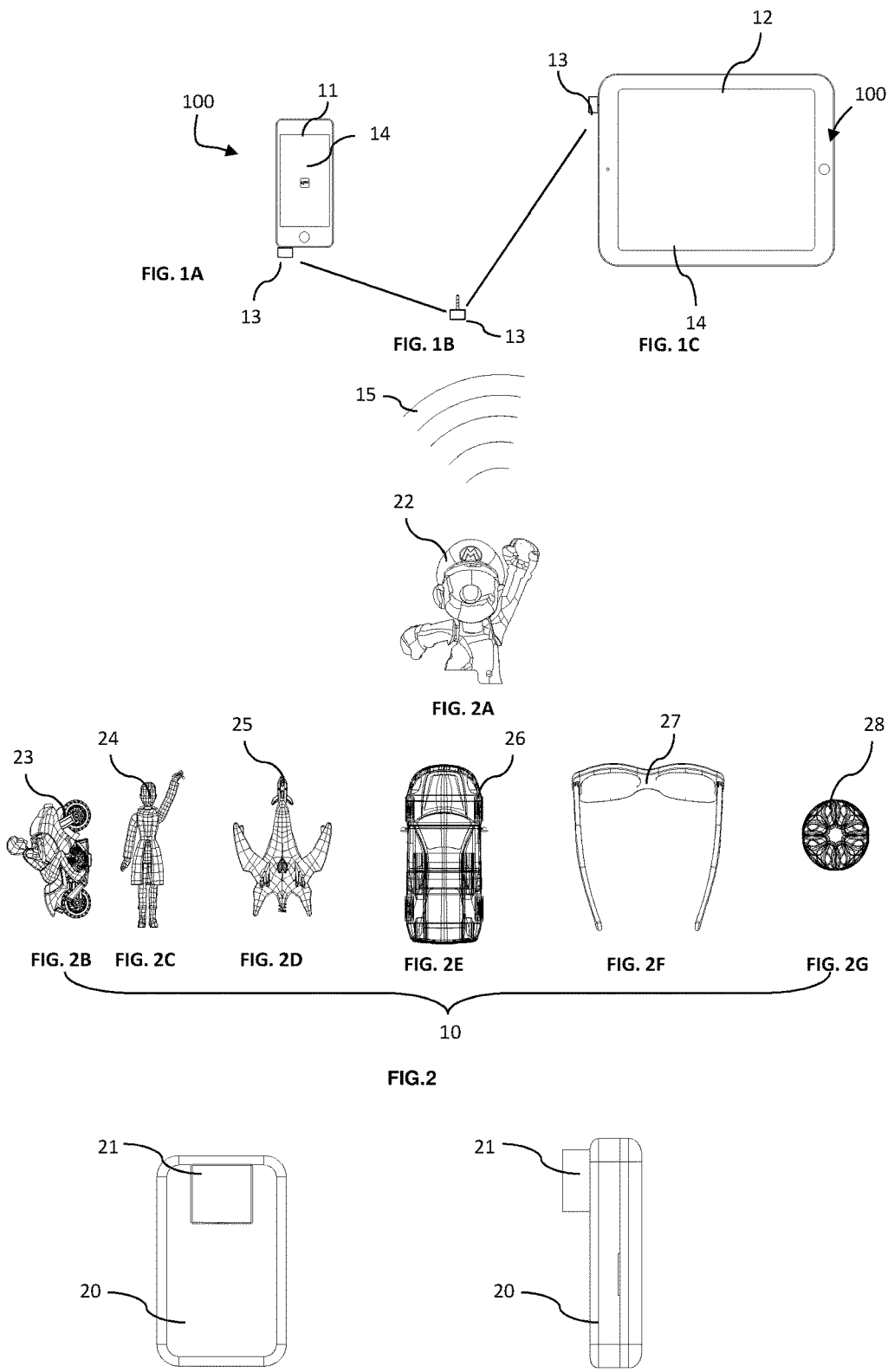

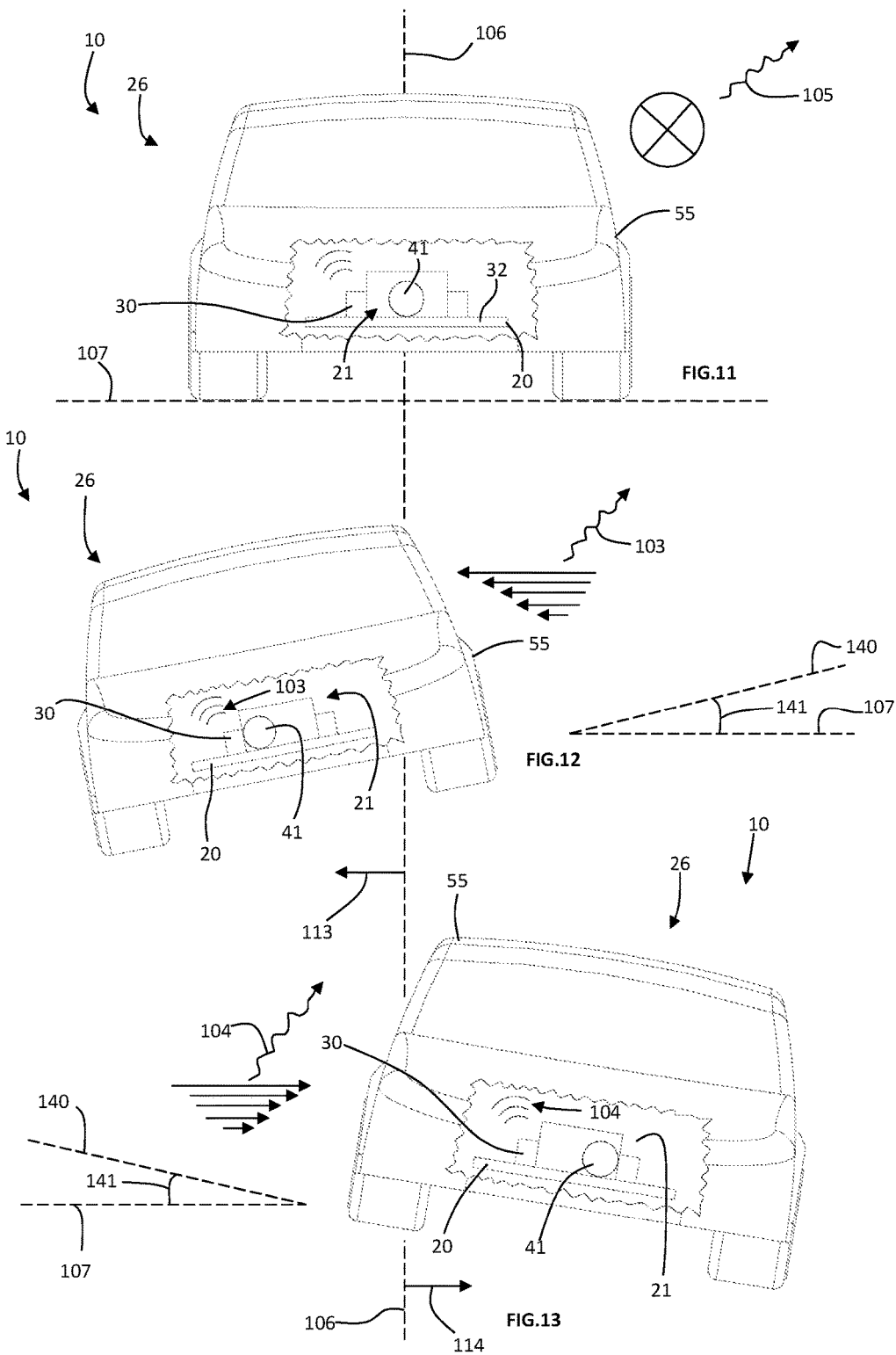

GAMING SYSTEM, KIT, AND METHOD FOR ENABLING INTERACTIVE PLAY

PRIOR HISTORY

This application is a Continuation-in-Part patent application of pending U.S. patent application Ser. No. 15/265,642 filed in the United States Patent and Trademark Office on 14 Sep. 2016, the specifications of which are hereby incorporated by reference thereto.

BACKGROUND OF THE INVENTION

Field of the Invention

The present invention generally relates to a gaming system for enabling gamers to simultaneously and interactively play with both a physical world control object or control device and a virtual world controllable object within a virtual gaming environment. More particularly, the present invention relates to the provision of a system of components and software applications implementable by a user's computer for enabling a controllable gaming experience by a hand-held control object or device externally ornamentally shaped to be reflective of the visually depicted virtual object situated within a video or visual gaming environment deployed upon the user's computer.

Brief Description of the Prior Art

United States Patent Application Publication No. 2004/0080494, authored by Fahlman, discloses a Force-Sensing Mouse Pointing Device for Computer Input. The '494 Publication describes a mouse device having a set of force sensors that measure vertical force with respect to the surface on which the mouse moves and pass information to the computer system in question. The mouse output can be used for: 1) downward force; 2) tilt in several directions; and 3) rotation. To sense tilt variations, the mouse device may preferably comprise three or four feet having an independent vertical force sensor on each of the feet.

United States Patent Application Publication No. 2010/0331087 ('087 Publication), authored by Argenter, discloses a Control Apparatus for Use with a Computer of Video Game System. The '087 Publication describes a device for controlling a display of a computer system for use with a video game. The device includes a coordinate control unit for providing information related to a vertical and horizontal tilt of the control device, a mouse control unit for inputting conventional mouse input information, a game control unit for inputting game control information and a controller for processing the information provided by the coordinate control unit, mouse control unit and game control unit. The vertical and horizontal point of view of the user in the video game and/or the vertical and horizontal position of a cursor on the display is determined based on the information related to the vertical and horizontal tilt of the control device. The control device is preferably shaped like a firearm to enhance the realism of the video game, but may also be shaped like a conventional game pad.

United States Patent Application Publication No. 2011/0221674 ('674 Publication), authored by Jenssen, discloses a Hand Held Control Device with Dual Mode Joystick for Pointing and Scrolling. The '674 Publication describes a mouse device for moving a visual pointer on a display for computer equipment. The control device is designed to be used hand held free of support from any surface, as the movement of the pointer in two dimensions takes place by means of a guide device or joystick. The guide pin preferably has a double function so that it may also be used for scrolling the display. The control device may include an attachment for the user's hand or wrist, and may be integrated with a telephone receiver or with a remote control for a television set or the like.

United States Patent Application Publication No. 2015/0199026 ('026 Publication), authored by Cook et al., discloses certain processes for Viewing Images with Tilt Control on a Hand-Held Device. The '026 Publication describes a user interface suitable for use in cellular phones and personal digital assistants (PDAs), PC Tablets, as well as laptops, PCs, office equipment, medical equipment, or any other hand-held electronic device, that allows control of the image on the device display by tilting the device to either change the view in perspective, change the magnification, or both, concurrently, by moving or tilting the device. Thus, the tilt of the device controls the angle of view of the image, and moving the device perpendicular to the screen controls the magnification. It will thus be understood that the Cook et al. publication teaches certain means for controlling visual information displayed upon a device by movement of the device itself as primarily determined via the use of an accelerometer internal to the device.

United States Patent Application Publication No. 2015/0346781 ('781 Publication), authored by Tokutake, discloses an Apparatus and Method for Controlling a Display based on a Manner of Holding the Apparatus. The '781 Publication describes a device having a display panel configured to display one or more interfaces and one or more motion sensors. The device includes circuitry configured to determine, based on an input from the one or more motion sensors, a tilt angle of the device. The circuitry is configured to select, based on the determined tilt angle, an interface, of the one or more interfaces, and to control the display panel to display the selected interface. As with the Cook et al. publication, the Tokutake publication also It will teaches certain means for controlling visual information displayed upon a device by movement of the device itself as primarily determined via the use of a motion sensor internal to the device.

As may be understood from a consideration of the foregoing, the prior art has shown a number of means for controlling activity via the manipulation and/or orientation of a hand-held, user-operable control device. It will be further understood, however, from a review of the foregoing, and the field of hand-held control devices and the like that the prior art perceives a need for a low cost gaming kit whereby a user may be provided with a real world hand-held toy outfitted with simple, low cost electronics for controlling virtual characters within a virtual gaming environment upon a user's communications device or computer via simple real world play with the hand-held toy substantially as summarized hereinafter.

SUMMARY OF THE INVENTION

The present invention basically provides a gaming system, kit, and method for enabling users thereof to experience overlapping real world and virtual world interactive game play upon a user's communications device or computer. Viewed systemically, the gaming invention may be said to preferably comprise or include a computer exemplified by a so-called smart phone, tablet computer, laptop computer or desktop computer; a toy type user-operable, handheld or wearable control device separate from the computer; means for enabling communications between the control device and the computer; and a gaming application or set of gaming software instructions implementable via the computer for providing or supporting the interactive game play. The basic idea is to provide a low cost gaming experience for users having access to a computer and who have an interest in handheld toys or wearable articles of various types, which handheld toys are virtually depicted upon the visual display of the computer during game play.

The gaming system, kit and method thus center on the user-operable, handheld or wearable control device otherwise referred to as a toy-type launcher. In this regard, the gaming kit includes an externally ornamental fanciful or amusing user-operable control device or launcher, as may be variously exemplified by cartoon characters, figurines, or dolls; toy vehicles such as toy motorbikes, cars, trucks, or airplanes; sports equipment such as toy bats, balls, or guns; and certain wearable products such as eyewear. The user-operable control device(s) or launcher(s) can then be manipulated via the user in some manner to control corresponding movements of virtual characters typically and visually corresponding with the external surfacing of the launcher within a gaming environment as displayed upon an electronic visual display of the computer.

Signals generated from within the user-operable control device(s) or launchers are transmitted from the user-operable control device(s) and communicated to the user's communications device or computer as variously exemplified. While any number of control signals are contemplated, the preferred essential practice of the invention contemplates at least four primary directional signals enabled via the signal-transmitting circuitry located internally relative to the externally ornamental surfacing of the user-operable control device or launcher. These four primary directional movement signals may preferably include forward, rearward, leftward and rightward directional signals. The directional movement signals, for example, may then be processed for controlling directional movements of the virtual object as displayed upon the electronic visual display of the user's computer. A preferred optional action button may also be incorporated for enabling the user to selectively input non-directional gaming input signals.

A signal-receiving and signal-relaying mechanism as may be exemplified by either a signal-transmitting/relaying dongle or signal-transmitting/relaying module may also be included within the kit and either outfitted upon the user's communications device or computer or be configured for wireless communications therewith. The signal-transmitting/relaying mechanism receives incoming wireless signal (s) from the control device or launcher and relays the signals to the computer processor that processes the signals for controlling movement of the virtual object upon the visual display of the computer. In this regard, a computer-implementable mobile gaming application separately installed on the user's communications device or computer processes the incoming movement control signals and implements instructions for governing movements or actions of virtual objects or characters within a gaming environment upon the electronic visual display to correspond with movements or actions employed by the user or directed into the user-operable control device or launcher.

The user may thus enjoy a gaming experience upon his or her communications device or computer, which gaming experience follows actions implemented by a separate toy or figurine that doubles as a gaming control device. The gaming experience within the virtual gaming environment thus follows the action of the handheld toy or figurine or wearable article. Signal-transmitting circuitry of a user-operable control device or launcher coordinates with a specified signal-transmitting/relaying dongle or module, and thus the user can direct a virtual character or toy to follow or mimic the real world movements of the control device or launcher.

The wireless communications enabled via the signal-transmitting/relaying dongle or module may be coordinated with a plurality of control devices (e.g. four toys) at the same time for group play. Noting that Bluetooth connections only allow a single toy to be connected for play, Bluetooth communications thereby limit gaming scenarios to single player applications. The present application, by contrast enables group play. Further, the circuit design according to the present invention assigns to every individual toy a unique control device identifier. Thus, no two toys will be treated as the same, even though many different individual toys will have the same or similar external appearance (and may be treated as the same toy in the retail sense). This feature allows the gaming application server to store game play results and achievement levels for each individual toy on a cloud-based server, which can be retrieved when each respective toy is in play the next time or for online interactive gaming.

BRIEF DESCRIPTIONS OF THE DRAWINGS

Other features of the invention will become more evident from a consideration of the following brief descriptions of the illustrations submitted in support of the subject invention:

FIG. 1A is a depiction of a smart phone-dongle assembly according to the present invention.

FIG. 1B is a depiction of a signal-communicating mechanism-dongle according to the present invention.

FIG. 1C is a depiction of a tablet type computer-dongle assembly according to the present invention.

FIG. 2A is a first representation of an exemplary user-operable control device or launcher according to the present invention, namely, a cartoon character figurine-type user-operable control device.

FIG. 2B is a second representation of an exemplary user-operable control device or launcher according to the present invention, namely, a toy motorbike type user-operable control device.

FIG. 2C is a third representation of an exemplary user-operable control device or launcher according to the present invention, namely, a doll figurine type user-operable control device.

FIG. 2D is a fourth representation of an exemplary user-operable control device or launcher according to the present invention, namely, a toy airplane type user-operable control device.

FIG. 2E is a fifth representation of an exemplary user-operable control device or launcher according to the present invention, namely, a toy car type user-operable control device.

FIG. 2F is a sixth representation of an exemplary user-operable control device or launcher according to the present invention, namely, eyewear type user-operable control device.

FIG. 2G is a seventh representation of an exemplary user-operable control device or launcher according to the present invention, namely, a ball type user-operable control device.

FIG. 3A is a top plan view of a signal-transmitting launcher mechanism according to the present invention showing the exterior housing of a tilt ball switch assembly operable as part of the signal-transmitting launcher mechanism.

FIG. 3B is a lateral edge view of the signal-transmitting launcher mechanism according to the present invention showing the exterior housing of a tilt ball switch assembly operable as part of the signal-transmitting launcher mechanism.

FIG. 11 is an enlarged rear end view of a toy car type user-operable control device according to the present invention with parts broken away to show an otherwise hidden signal-transmitting launcher mechanism housed within a housing of the toy car type user-operable control device.

FIG. 12 is an enlarged rear end view of a toy car type user-operable control device according to the present invention tilted downwardly in a leftward direction and with parts broken away to show an otherwise hidden signal-transmitting launcher mechanism housed within a housing of the toy car type user-operable control device.

FIG. 13 is an enlarged rear end view of a toy car type user-operable control device according to the present invention tilted downwardly in a rightward direction and with parts broken away to show an otherwise hidden signal-transmitting launcher mechanism housed within a housing of the toy car type user-operable control device.

Figure 27:
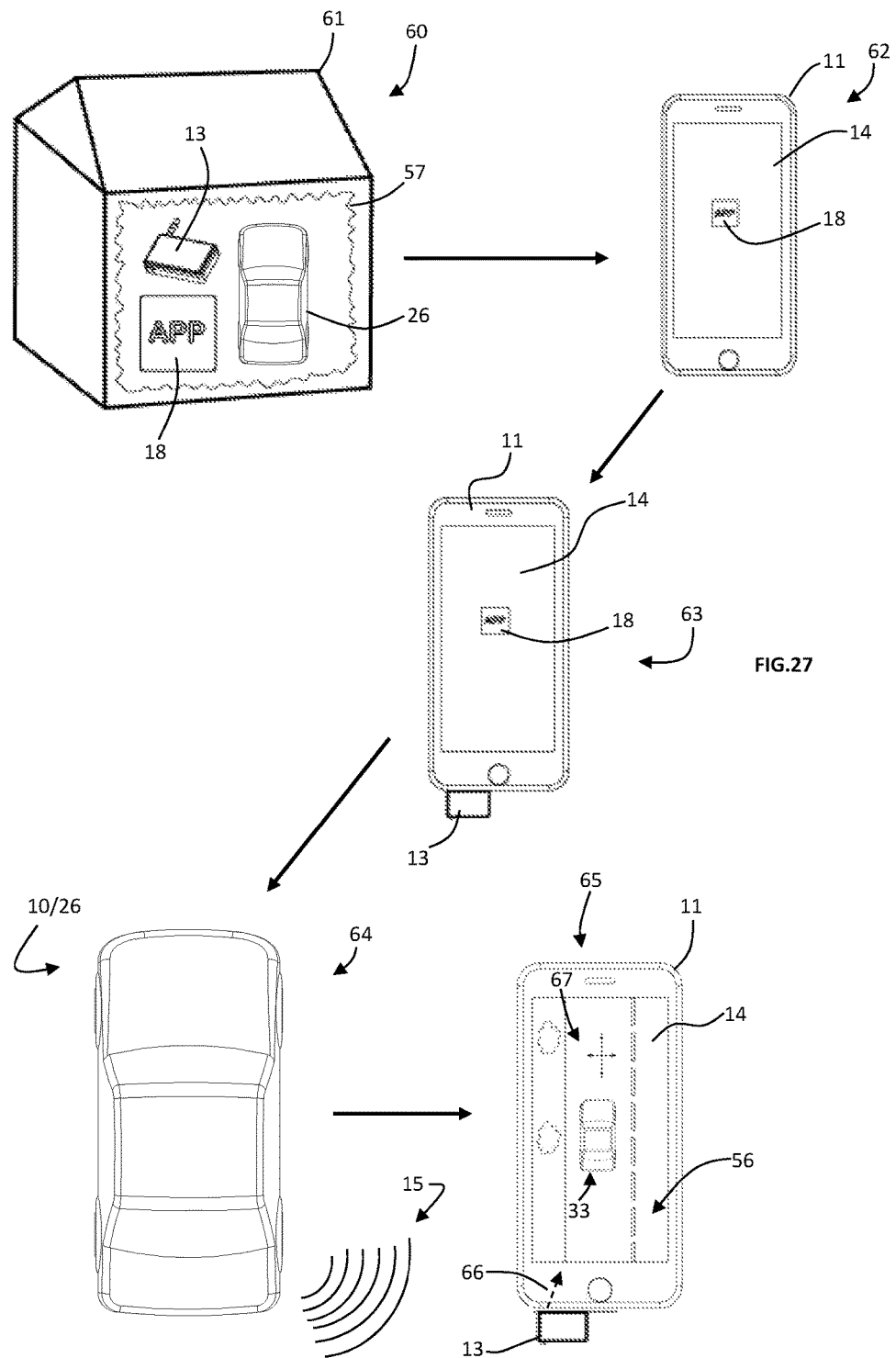

FIG. 27 is a flowchart type diagram symbolically showing a series of steps according to the present invention, including an initial step of the provision of a gaming kit, downloading software upon a mobile communications device, communicating the software with a car-shaped control device via a signal-transmitting/relaying dongle outfitted upon or otherwise communicable with the mobile communications device, and effecting virtual car movement in a visual gaming environment upon the visual display of the mobile communications device via the car-shaped control device and the downloaded software.

Figure 28A:
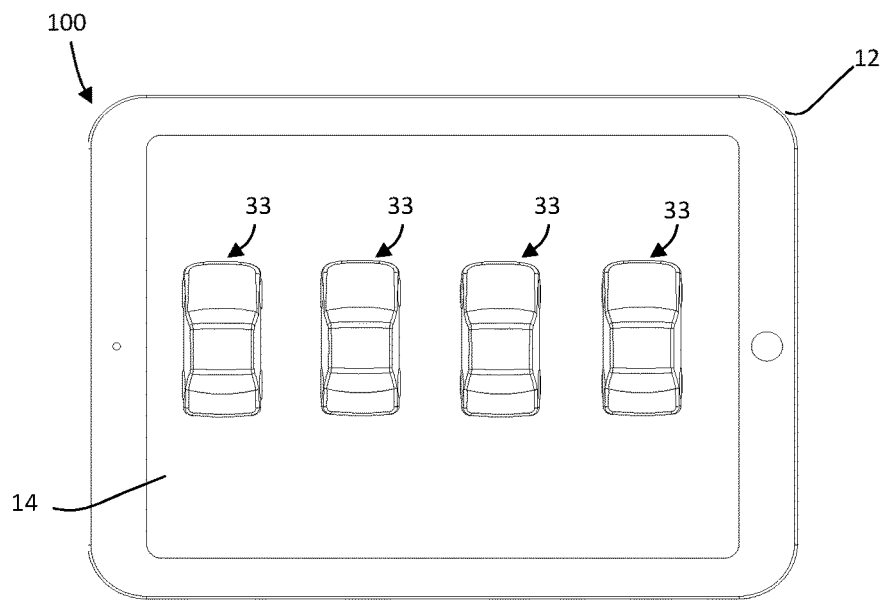

FIG. 28A is a first sequential depiction of a tablet computer apparatus with a virtual gaming scenario depicted upon the visual display screen of the tablet computer apparatus, the virtual gaming scenario including a series of four car type virtual objects controllable within a virtual gaming environment of the virtual gaming scenario.

Figure 28B:
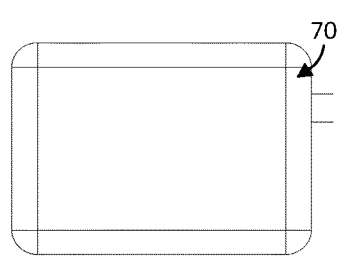
Figure 28C:
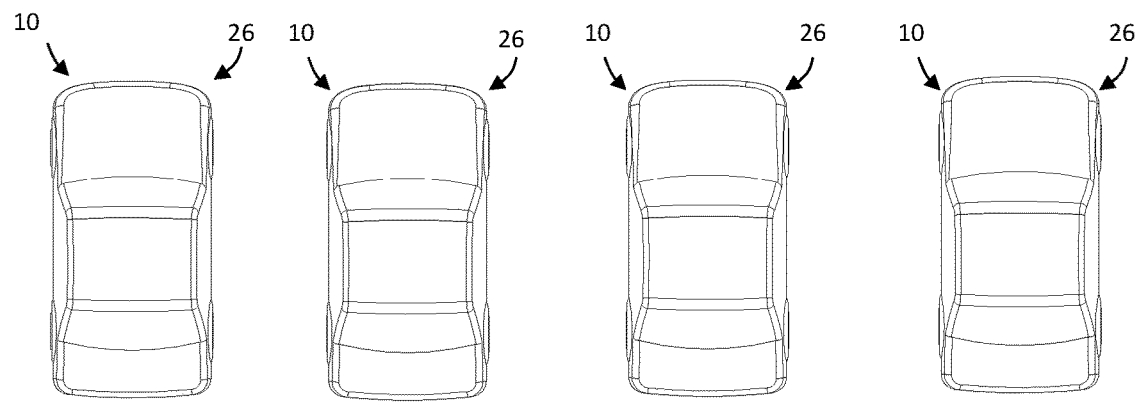

FIG. 28B is a first sequential depiction of a stand-alone signal-transmitting/relaying mechanism according to the present invention shown in relative close proximity to the tablet computer apparatus otherwise shown in FIG. 28A for transmitting/relaying signals coming from the car-shaped control objects shown in FIG. 28C to the tablet computer apparatus shown in FIG. 28A.

FIG. 28C is a first sequential depiction of a series of four side-by-side exemplary user-operable control devices or launchers according to the present invention, namely, toy car type user-operable control devices shown in relative close proximity to the stand-alone signal-transmitting/relaying mechanism shown in FIG. 28B for generating signals directable to the tablet computer apparatus shown in FIG. 28A via the stand-alone signal-transmitting/relaying mechanism.

Figure 29A:
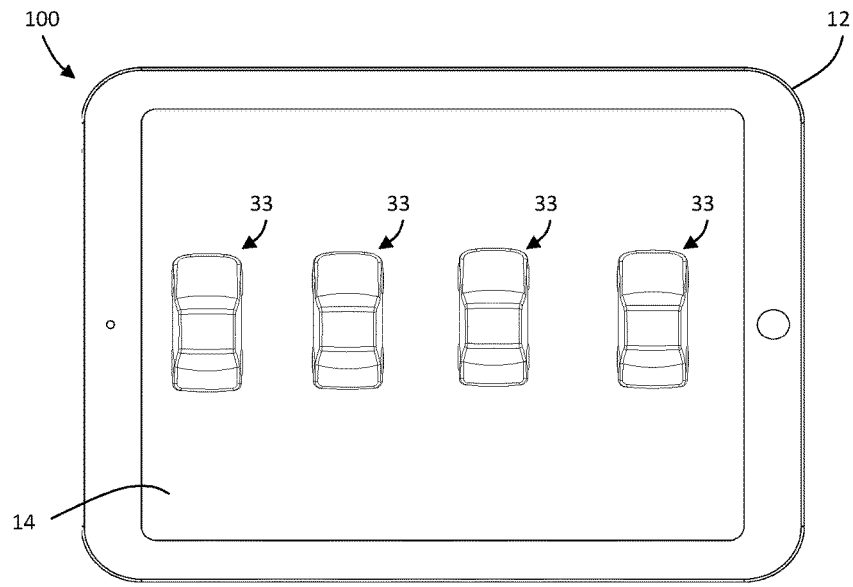

FIG. 29A is a second sequential depiction of a tablet computer apparatus with a virtual gaming scenario depicted upon the visual display screen of the tablet computer apparatus, the virtual gaming scenario including a series of four car type virtual objects controllable within a virtual gaming environment of the virtual gaming scenario before signals are processed for controlling movement of the virtual objects within the virtual gaming environment.

Figure 29B:
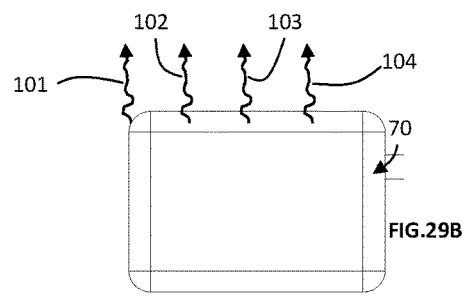
Figure 29C:
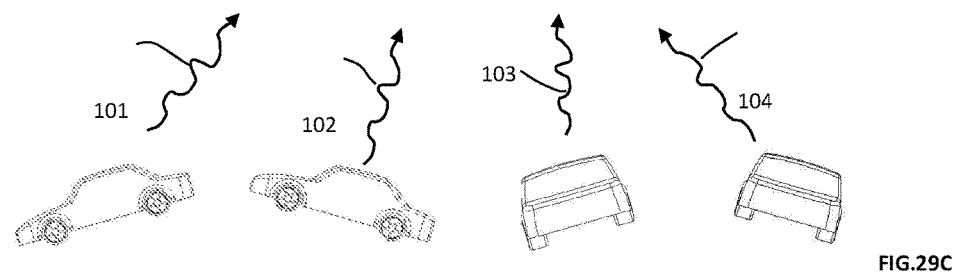
Figure 29D:
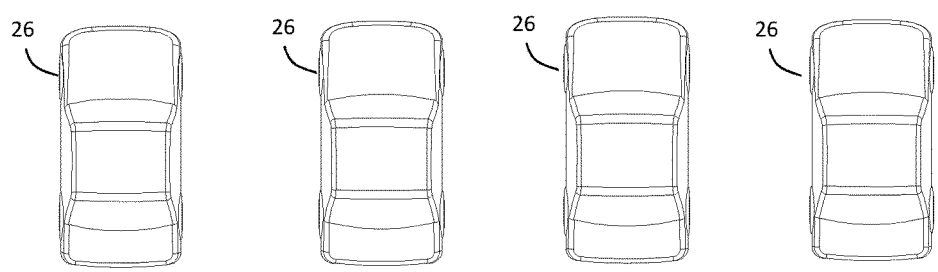

FIG. 29B is a second sequential depiction of a stand-alone signal-transmitting/relaying mechanism according to the present invention shown in relative close proximity to the tablet computer apparatus otherwise shown in FIG. 29A for transmitting/relaying signals coming from the car-shaped control objects shown in FIG. 29D to the tablet computer apparatus shown in FIG. 29A with signals being transmitted to the tablet computer apparatus from the signal-transmitting/relaying mechanism for controlling movement of the virtual objects within the virtual gaming environment.

FIG. 29C is a diagrammatic depiction of a series of four car-shaped control objects reduced in size from FIGS. 9, 10, 12, and 13 to diagrammatically depict corresponding movement control signals being transmitted to the signal-transmitting/relaying mechanism shown in FIG. 29B.

FIG. 29D is a second sequential depiction of a series of four side-by-side exemplary user-operable control devices or launchers according to the present invention, namely, toy car type user-operable control devices shown in relative close proximity to the stand-alone signal-transmitting/relaying mechanism shown in FIG. 29B generating the movement control signals otherwise and respectively shown in FIG. 29C.

Figure 30A:
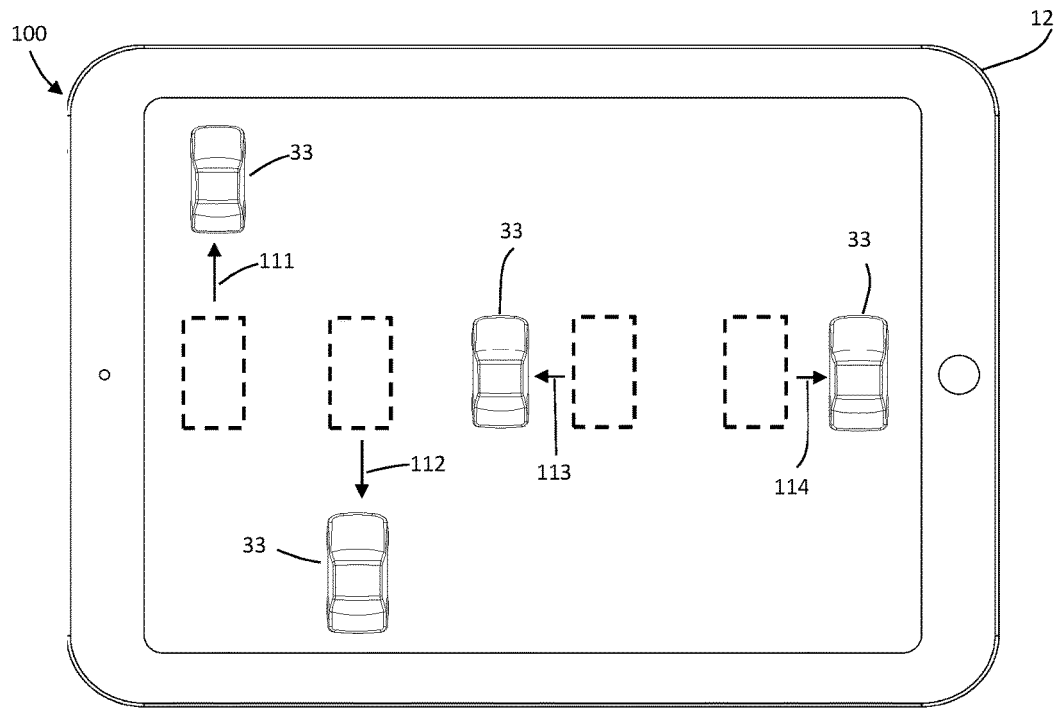

FIG. 30A is a third sequential depiction of a tablet computer apparatus with a virtual gaming scenario depicted upon the visual display screen of the tablet computer apparatus, the virtual gaming scenario including a series of four car type virtual objects controllable within a virtual gaming environment of the virtual gaming scenario after primary movement control signals are processed, the virtual objects thus being moved within the virtual gaming environment accordingly.

Figure 30B:
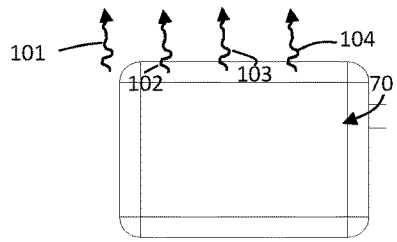
Figure 30C:
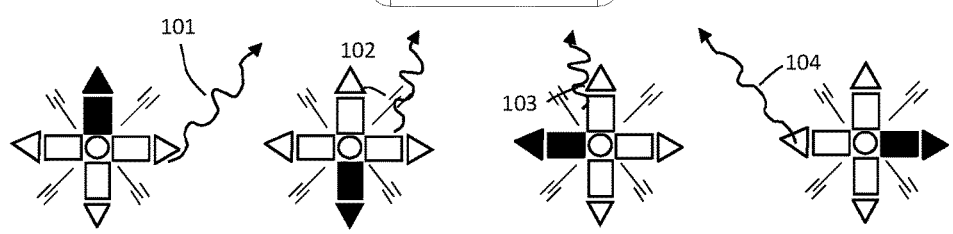
Figure 30D:
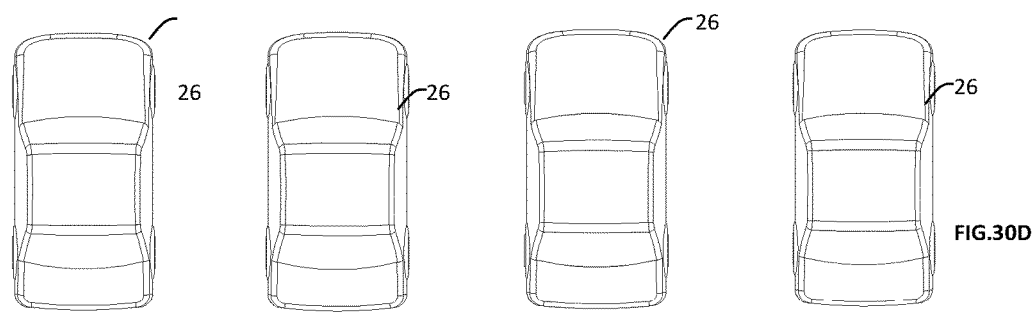

FIG. 30B is a third sequential depiction of a stand-alone signal-transmitting/relaying mechanism according to the present invention shown in relative close proximity to the tablet computer apparatus otherwise shown in FIG. 30A for transmitting/relaying signals coming from the car-shaped control objects shown in FIG. 30D to the tablet computer apparatus shown in FIG. 30A with primary movement control signals being transmitted to the tablet computer apparatus from the signal-transmitting/relaying mechanism for controlling primary directional movements of the virtual objects within the virtual gaming environment.

Figure 15:
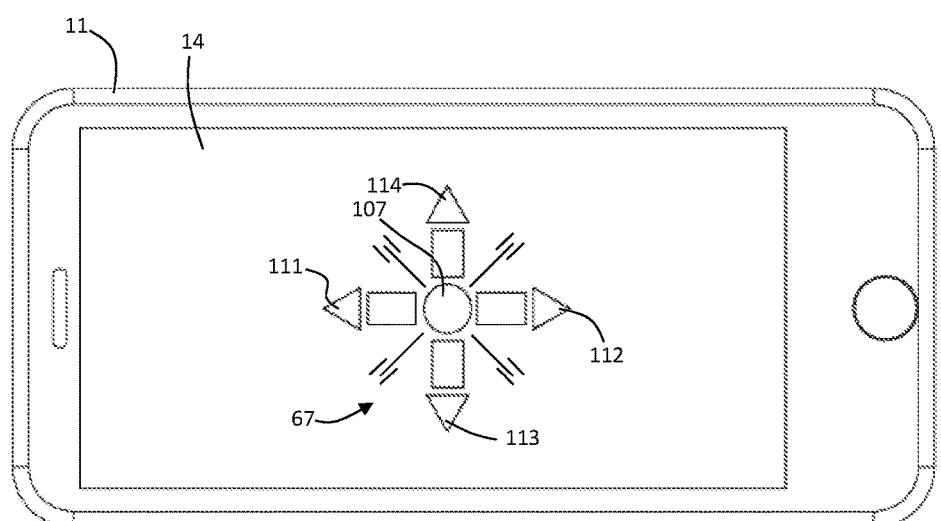
FIG. 15 is an enlarged depiction of a smart phone apparatus with an enlarged vector cross depicted upon the visual display screen of the smart phone apparatus, the vector cross being demonstrative of directional cues for controlling the virtual object within the virtual gaming scenario according to the present invention.
Figure 16:
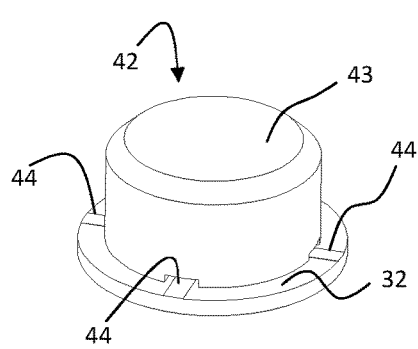
FIG. 16 is a top perspective view of an exemplary current-conductive enclosure of a tilt switch assembly according to the present invention.
Figure 17:
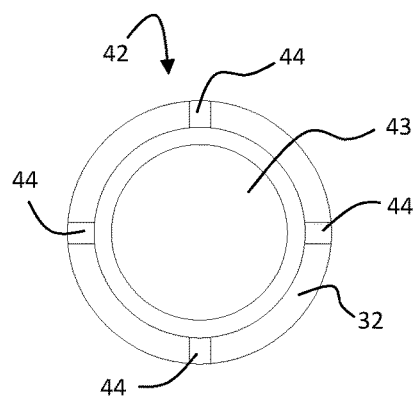
FIG. 17 is a top perspective view of an exemplary current-conductive enclosure of a tilt switch assembly according to the present invention.

FIG. 30C is a diagrammatic depiction of a series of four vector crosses demonstrative of directional cues for controlling virtual objects within the virtual gaming scenario as otherwise depicted in FIG. 15 to diagrammatically depict corresponding primary movement control signals being transmitted to the signal-transmitting/relaying mechanism shown in FIG. 30B.

FIG. 30D is a third sequential depiction of a series of four side-by-side exemplary user-operable control devices or launchers according to the present invention, namely, toy car type user-operable control devices shown in relative close proximity to the stand-alone signal-transmitting/relaying mechanism shown in FIG. 30B generating the primary movement control signals otherwise and respectively shown in FIG. 30C.

Figure 31A:
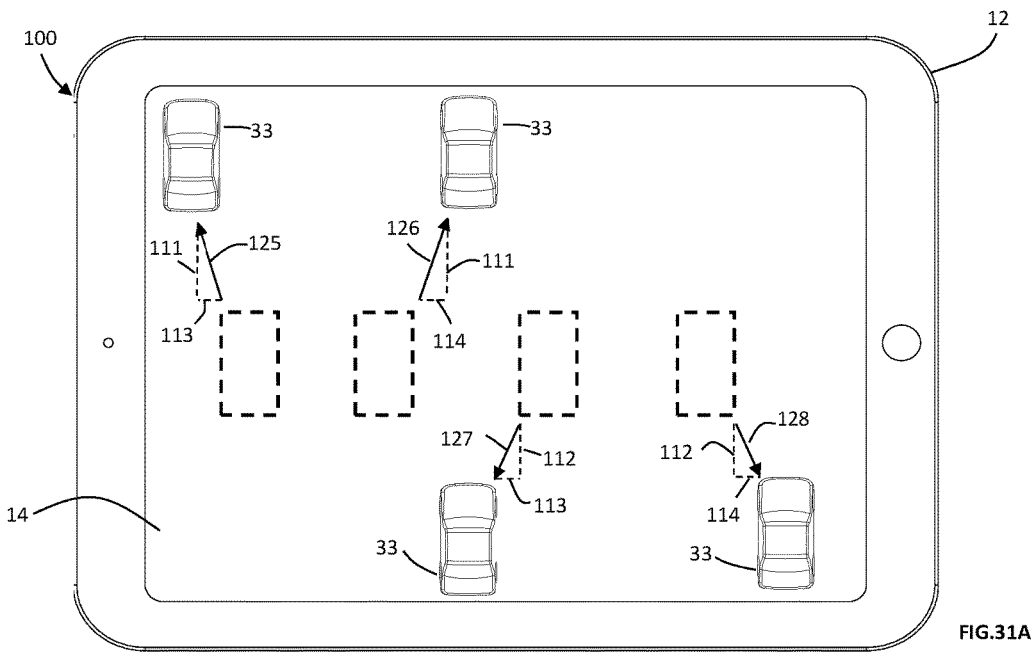

FIG. 31A is a fourth sequential depiction of a tablet computer apparatus with a virtual gaming scenario depicted upon the visual display screen of the tablet computer apparatus, the virtual gaming scenario including a series of four car type virtual objects controllable within a virtual gaming environment of the virtual gaming scenario after complex or combination movement control signals are processed, the virtual objects thus being moved within the virtual gaming environment accordingly.

Figure 31B:
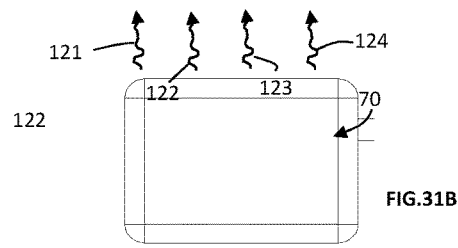
Figure 31C:
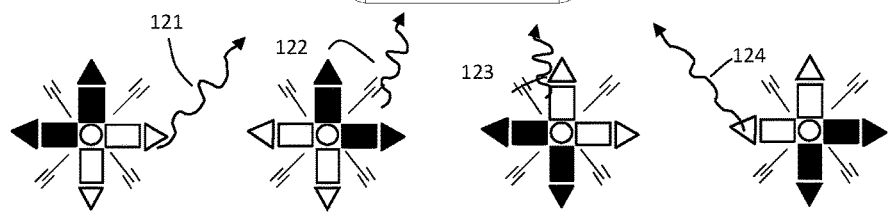
Figure 31D:
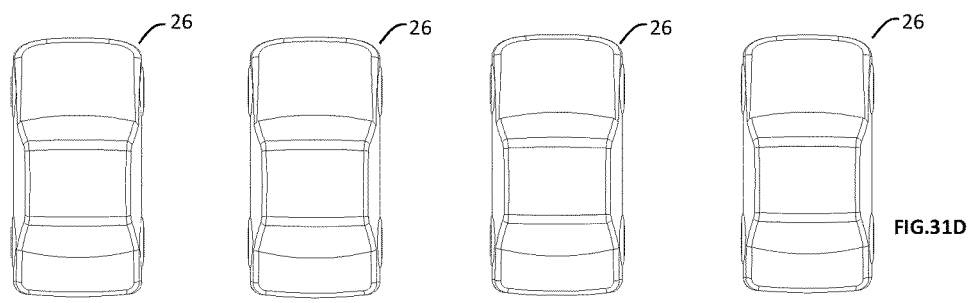

FIG. 31B is a fourth sequential depiction of a stand-alone signal-transmitting/relaying mechanism according to the present invention shown in relative close proximity to the tablet computer apparatus otherwise shown in FIG. 31A for transmitting/relaying signals coming from the car-shaped control objects shown in FIG. 31D to the tablet computer apparatus shown in FIG. 31A with complex or combination movement control signals being transmitted to the tablet computer apparatus from the signal-transmitting/relaying mechanism for controlling complex or combination directional movements of the virtual objects within the virtual gaming environment.

FIG. 31C is a diagrammatic depiction of a series of four vector crosses demonstrative of directional cues for controlling virtual objects within the virtual gaming scenario as otherwise depicted in FIG. 15 to diagrammatically depict corresponding complex or combination movement control signals being transmitted to the signal-transmitting/relaying mechanism shown in FIG. 31B.

FIG. 31D is a fourth sequential depiction of a series of four side-by-side exemplary user-operable control devices or launchers according to the present invention, namely, toy car type user-operable control devices shown in relative close proximity to the stand-alone signal-transmitting/relaying mechanism shown in FIG. 31B generating the complex or combination movement control signals otherwise and respectively shown in FIG. 31C.

Figure 32:
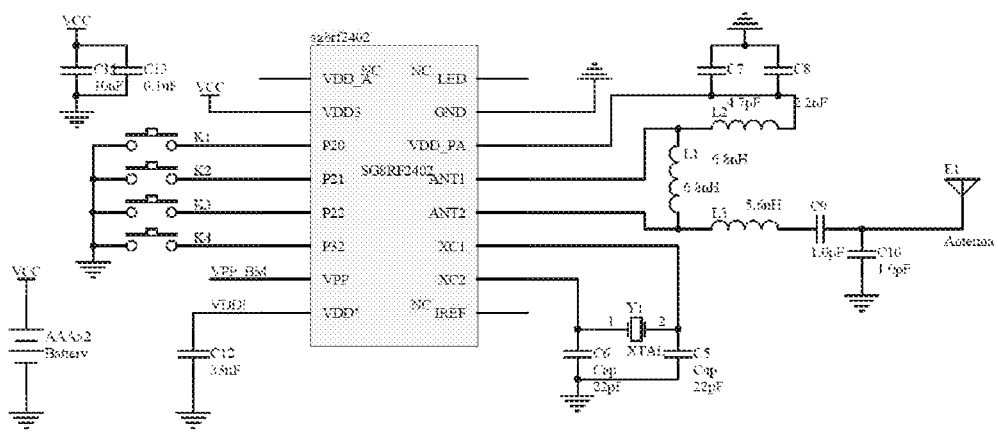

FIG. 32 is a first depiction of an exemplary circuit diagram of movement control signal-generating circuitry located within each control device according to the present invention.

Figures 33A, 33B:
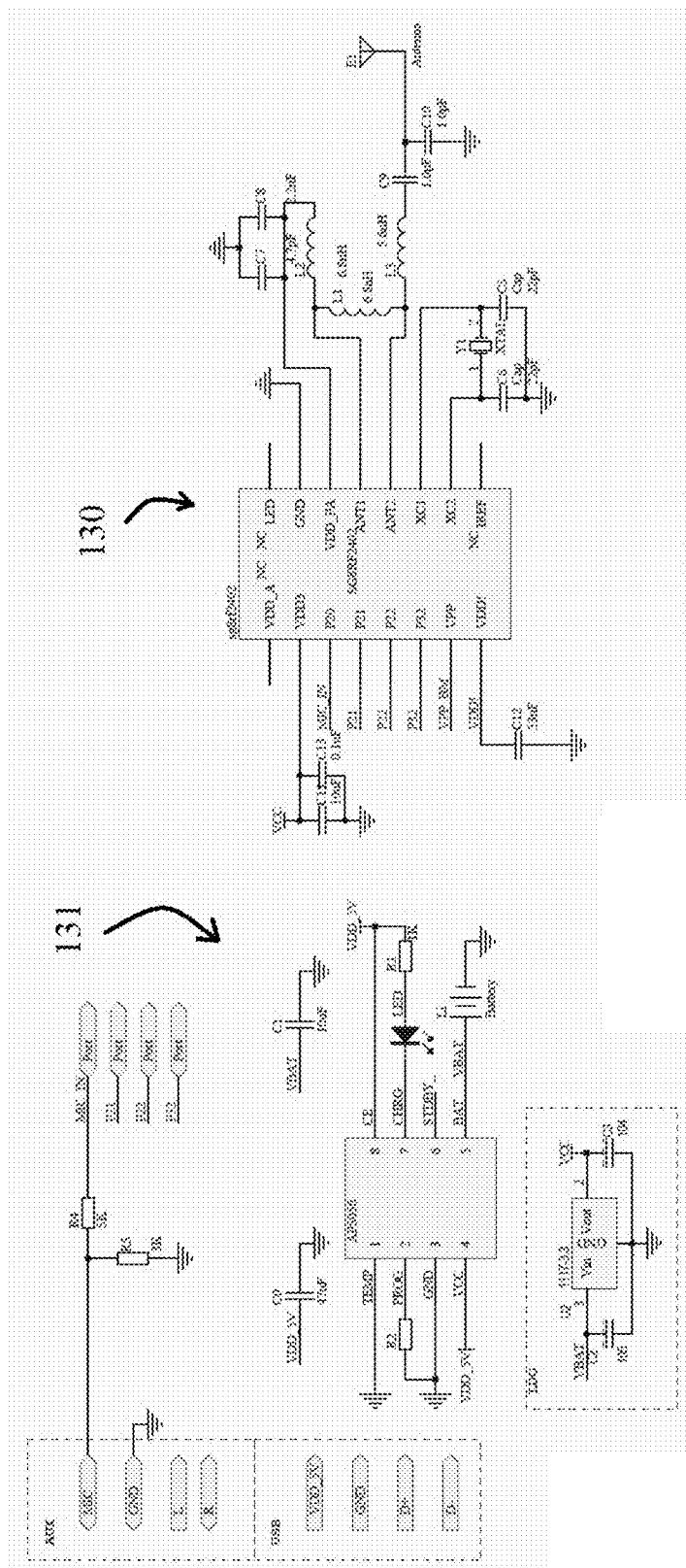

FIG. 33A is an exemplary circuit diagram of movement control signal-transmitting/relaying circuitry located within an exemplary signal-transmitting/relaying mechanism according to the present invention.

FIG. 33B is a second depiction of the exemplary circuit diagram of movement control signal-generating circuitry located within each control device according to the present invention shown in side-by-side relation to the circuit diagram shown in FIG. 33A for ease of comparison.

Figure 34:
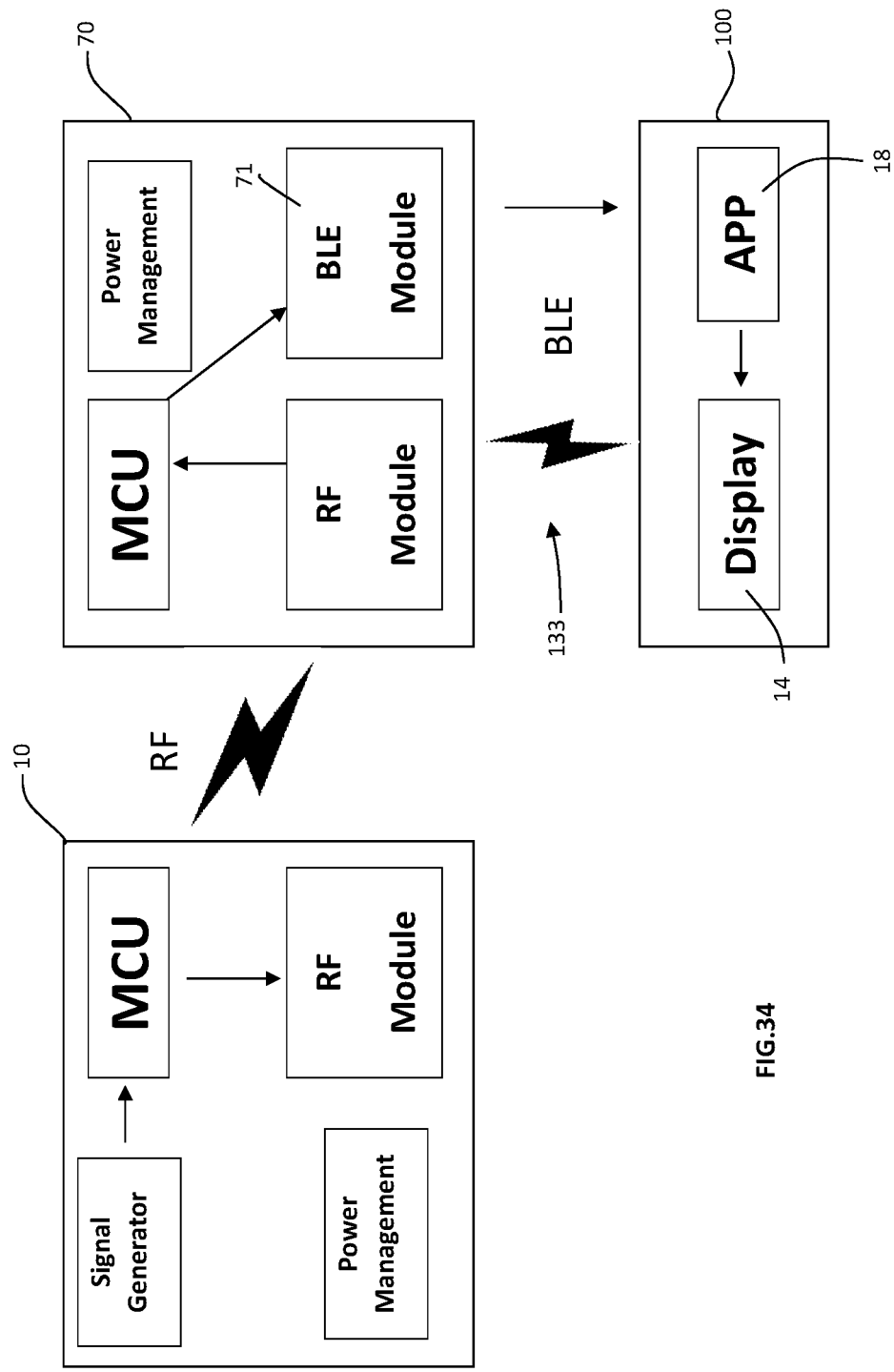

FIG. 34 is a schematic diagram showing the three primary systemic components of the subject invention, including a control device, a signal-transmitting/relaying mechanism and a gaming computer exemplified by a smart phone, table computer, or smart television.

DETAILED DESCRIPTION OF THE PREFERRED EMBODIMENTS

Referring now to the drawings with more specificity, the present invention preferably provides a gaming system, kit, and method for enabling users thereof to experience overlapping real world and virtual world interactive game play upon a user's communications device or computer 100 as exemplified by a smart phone as at 11 or tablet type apparatus as at 12. Other computer-based devices such as laptop and desktop type computers, and smart televisions, although not illustrated, are contemplated as being embraced by these specifications and would also enable the gaming experience here described. The system according to the present invention necessarily includes a computer 100 and an electronic visual display as at 14 for enabling visualized gaming.

The gaming system according to the present invention is operable via computer-implementation and thus some basic software-processing means are also believed essential to the practice of the present invention. Viewed systemically, the gaming invention may thus be said to preferably comprise or include a computer 100, a user-operable control device or launcher separate from the computer 100, means for communicating the control device or launcher with the computer 100, and a gaming application or set of software instructions implementable via the computer 100.

Central to the practice of the present gaming invention is the user-operable control device or launcher as variously exemplified or embodied and generically referenced at 10. In this regard, the present invention provides the user with a user-operable control device or launcher 10, as may be variously exemplified by an external ornamental appearance of a cartoon character figurine 22, a toy motorbike 23, a doll figurine 24, a toy airplane 25, a toy car 26, certain wearable products such as eyewear 27, a ball as at 28, etc. The user-operable control device(s) or launcher(s) 10 can then be manipulated via the user in some manner to control corresponding movements of virtual characters within a virtual gaming environment as visually displayed upon an electronic visual display 14 of the computer 100.

Signals generated by the user-operable control device(s) 10 are transmitted from the user-operable control device(s) 10 and communicated to the user's communications device or computer 100 exemplified by a smart phone as at 11 or tablet type apparatus as at 12. While any number of virtual object control signals are contemplated, the preferred essential practice of the invention contemplates at least four primary directional signals enabled via the signal-transmitting circuitry of the user-operable control device(s) 10. These four primary directional movement signals may preferably include an anterior or forward directional signal as at 101; a posterior or rearward directional signal as at 102; a left lateral directional signal as at 103; and a right lateral directional signal as at 104.

The directional movement signals, for example, may then be processed for controlling directional movements of a virtual object 33 as displayed upon the electronic visual display 14 of the computer 100. The anterior or forward directional signal 101 may prompt a forward directional movement as at 111; the posterior or rearward directional signal 102 may prompt a rearward directional movement as at 112; the left lateral directional signal 103 may prompt a left lateral directional movement as at 113; and the right lateral directional signal 104 may prompt a right lateral directional movement as at 114.

Comparatively referencing FIGS. 30A through 30D versus FIGS. 31A through 31D, the reader will there consider certain primary virtual object control signals versus certain alternative virtual object control signals. Whereas the four primary directional movement signals may preferably include forward directional signal 101; rearward directional signal 102; left lateral directional signal 103; and right lateral directional signal 104, the vector headings for these movement signals could conceivably be combined to effect diagonal movement signals as generally referenced and depicted at left-forward directional signal 121; right-forward directional signal 122; left-rearward directional signal 123; and right-rearward directional signal 124.

The left-forward directional signal 121 may thus prompt a combination left directional movement 113 and forward directional movement 111; the right-forward directional signal 122 prompts a combination right directional movement 114 and forward directional movement 111; the left-rearward directional signal 123 prompts a combination left directional movement 113 and rearward directional movement 112; the right-rearward directional signal 124 prompts a combination right directional movement 114 and rearward directional movement 112. The directional movements combine to form resultant diagonal movement vectors as at 125, 126, 127, and 128, respectively.

More particularly, the user may thus play with a hand-operable toy or wearable article effecting some real world action by doing so, and the signal-transmitting circuitry within the hand-operable toy or wearable article will detect or sense these playful actions through certain device-orientation sensing means within or made cooperable with the toy (e.g. an accelerometer or g-sensor, gyroscope, or ball bearing type switch). The signal-transmitting circuitry and sensing means may preferably transform these signals into wireless signals (e.g. 2.4G) as at 15 for further transmission to the user's communication device or computer 100 for controlling virtual game play upon the electronic visual display 14. Exemplary control device circuitry is generally depicted and referenced in FIG. 32 at circuit diagram 130.

A first alternative signal-transmitting/relaying mechanism is exemplified by a signal-transmitting/relaying dongle 13 may be preferably outfitted upon the user's communications device or computer 100. Exemplary dongle device circuitry is generally depicted and referenced in FIG. 33A at circuit diagram 131 in side-by-side relation to control device circuitry 130 in FIG. 33B. Comparatively referencing FIGS. 1A, 1B, 1C, 4, and 33A, it will be understood that the signal-transmitting/relaying dongle 13 may be plugged into a signal-transmitting/relaying interface of the smartphone 11 or tablet 12 as exemplified by an USB input or earphone auxiliary jack 19.

A second alternative signal-transmitting/relaying mechanism is exemplified by a signal-transmitting/relaying stand-alone module as at 70. The signal-transmitting/relaying stand-alone module 70 is wirelessly or remotely cooperable and communicable with the user's communications device or computer 100 and the control device(s) 10 for relaying signals from the control device(s) 10 to the computer 100 as generally depicted in FIGS. 28A-28C; 29A-29D; 30A-30D; and 31A-31D. It is contemplated that the signal-transmitting/relaying stand-alone module 70 may be exemplified by comprising or providing a Bluetooth Low Energy or BLE module for wirelessly transmitting BLE signals 133 (as otherwise variously exemplified at 101, 102, 103, 104, 105, 121, 122, 123, and 124) to the computer 100 as generally depicted and referenced in FIG. 34.

The signal-transmitting/relaying mechanisms 13 and/or 70 receive incoming wireless movement control signal(s) and relay those movement control signals to the computer 100 upon which computer 100 is installed a computer-implementable (mobile) gaming application as generically depicted by APP icon 18. The computer-implementable gaming application 18 is separately installable on the user's communications device or computer 100 for processing the incoming movement control signals and implementing instructions for governing movements or actions of virtual objects or characters within a gaming environment visually displayed upon the electronic visual display 14 that correspond with movements or actions employed by the user or directed into the user-operable control device(s) 10.

The user may thus simultaneously enjoy both a virtual gaming experience visually displayed upon his or her communications device or computer 100, and real world play action achieved by manipulation of the handheld toy or wearable article. The gaming experience thus enabled by the present invention, in part, embraces play action(s) implemented by a separate hand-operable toy or figurine or wearable article that doubles as a gaming control device, as well as a virtual gaming environment thus follows or mimics the play action(s) of the hand-operable toy or figurine or wearable article. Signal-transmitting circuitry of the toy-type, user-operable control device or launcher 10 communicates with a specified signal-transmitting/relaying mechanisms 13 and/or 70 and the user can direct a virtual character to follow the launcher toy's actions.

The signal-transmitting launcher device 10 can be associated with any number of toys, such as a toy car as at 26, a toy airplane as at 25, a toy gun (not specifically illustrated), a doll or similar other fanciful figurine as at character 22 or doll 24, or a ball as at 28. The signal-transmitting circuitry is preferably hidden within a circuitry housing provided by the user-operable control device 10 and communicates with the user's communications device or computer 100 via the signal-transmitting/relaying mechanisms 13 and/or 70 to effect game play via the gaming application separately installed on the user's communications device or computer 100.

Referencing FIGS. 3A and 3B, the reader will there comparatively consider a signal-transmitting launcher mechanism 20, which signal-transmitting launcher mechanism 20 is preferably incorporated into a user-operable control device 10 exemplified by any number of toys or figurines and which signal-transmitting launcher mechanism 20 may alternatively comprise an accelerometer or gravity sensor (g sensor) or an inexpensive, tilt ball switch assembly as at 21 for generating primary movement control signals 101, 102, 103, and 104. The signal-transmitting circuitry or launcher mechanism 20 necessarily further preferably comprises a signal transmitter as at generic box 30 and a power source or battery as at generic box 31 all in communication with one another via Printed Circuit Board or PCB, examples of which are generally depicted and referenced at element 32.

Figure 4:
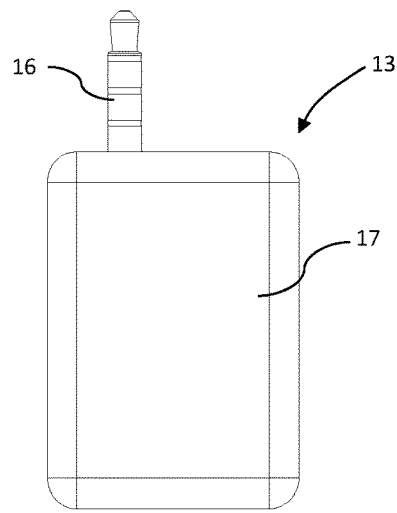
FIG. 4 is an enlarged depiction of a signal-communicating dongle usable in combination with the present invention.

Referencing FIG. 4, the reader will there consider an anterior view of a preferred signal-receiver mechanism or dongle 13 according to the present invention. The signal-receiving mechanism or dongle 13 preferably comprises a 3.5 mm pin plug as at 16 and a signal processing system or signal receiver module as at 17, inclusive of a power system. The signal-receiving mechanism or dongle 13 preferably connects or interfaces with a smartphone 11 or tablet 12 by way of the 3.5 mm pin plug 16, and the signal processing system 17 receives incoming wireless signals 15, transforms or converts the incoming wireless signals 15 into electric signals and outputs those electrical signals to the smartphone 11, tablet 12, smart television (not specifically illustrated) all as generally embraced by computer 100. FIG. 5B depicts a bottom edge view of a smartphone 11 with 3.5 mm pin plug 16 insertable into an earphone jack 19 outfitted upon the user's communications device or computer 100.

FIG. 4A generally depicts the anterior face of a typical smartphone 11 usable in combination with or as part of the present invention. When the user downloads and installs a gaming (mobile) application or set of software instructions for governing game play according to the present invention, an application icon as at APP 18 is preferably displayed upon the electronic visual display 14 of the computer 100. Once the gaming application is installed upon the user's communications device or computer 100, the specified application may be launched by clicking on the APP icon 18. The gaming application as at APP 18, via the computer 100, establishes communications with the signal-transmitting/relaying mechanism(s) 13 or 70 and the signal-generating/transmitting circuitry housed within or otherwise made cooperable with the user-operable control device(s) 10.

When the gaming application is initiated, the electronic visual display 14 displays at least one, but possibly several virtual objects as at 33 within a virtual gaming environment according to various specified games. An example of such a gaming environment is basically depicted in FIG. 15. In this case, referencing FIG. 15, the reader will consider virtual object 33. Virtual object 33 is preferably reflective of a real world, user-operable control device 10 exemplified by a toy car 26. The virtual object 33 depicted in FIG. 15 thus resembles a car that corresponds to the toy car 26 type user-operable control device 10. In this case, the gaming environment, also displayed upon the electronic visual display 14, resembles a virtual roadway 35 with a left lane 36 and a right lane 37 with a virtual roadside 38 also depicted with grass 39 and shrubbery 40.

Figure 9:
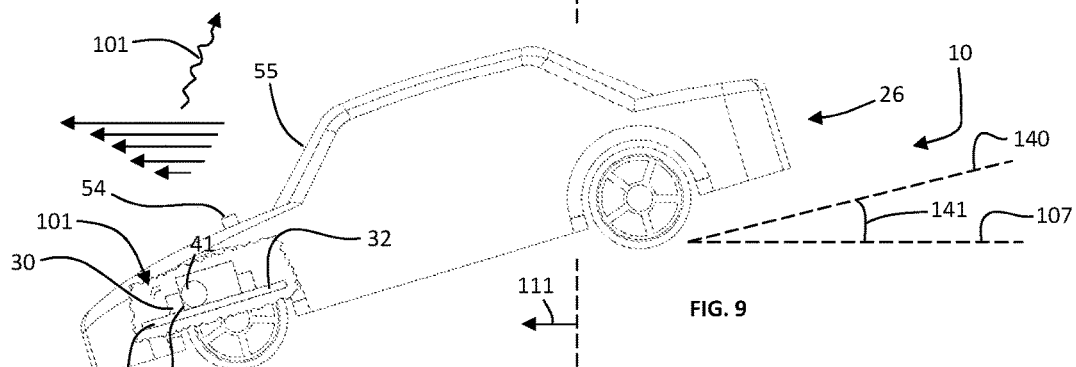
FIG. 9 is an enlarged lateral view of a toy car type user-operable control device according to the present invention tilted downwardly in a forward direction and with parts broken away to show an otherwise hidden signal-transmitting launcher mechanism housed within a housing of the toy car type user-operable control device.
Figure 10:
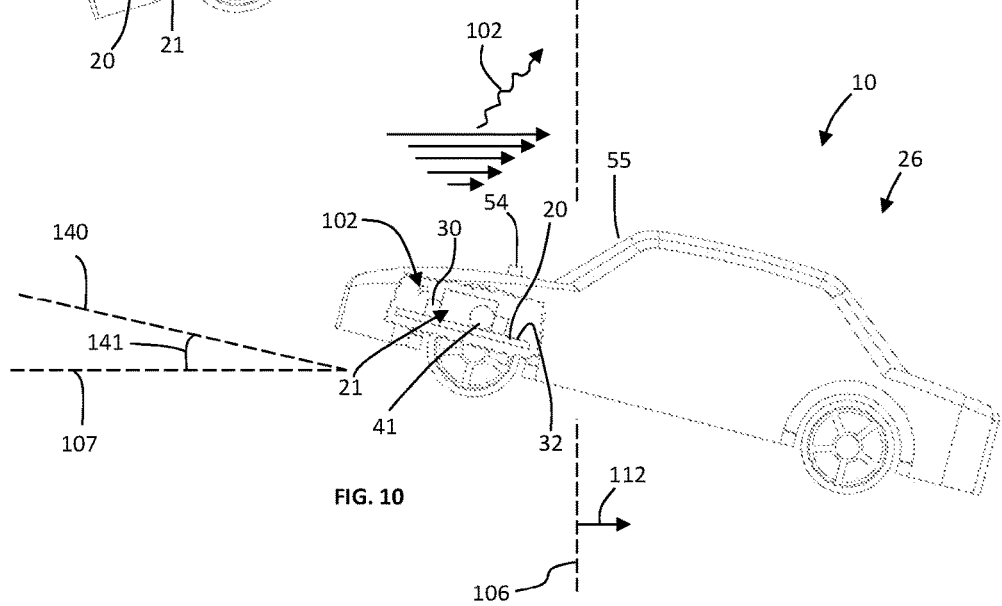
FIG. 10 is an enlarged lateral view of a toy car type user-operable control device according to the present invention tilted downwardly in a rearward direction and with parts broken away to show an otherwise hidden signal-transmitting launcher mechanism housed within a housing of the toy car type user-operable control device.

Comparatively referencing FIGS. 6-13, the reader will there consider toy car 26 type user-operable control device 10. Each of the figures is presented with parts broken away to otherwise show the hidden internal signal-generating/transmitting circuitry of the launch mechanism 20 outfitted with an alternative tilt ball switch assembly 21. Equilibrium positions are depicted for the toy car 26 type user-operable control device 10 in FIGS. 6, 7, 8, and 11. A forward tilt position is generally depicted in FIG. 9; a rearward tilt position is generally depicted in FIG. 10; a leftward tilt position is generally depicted in FIG. 12; and a rightward tilt position is generally depicted in FIG. 13. It is contemplated that the circuitry be programmed so as to register a movement when an angle (as at 141) of 30 degrees or more is achieved or reached between an object reference plane as at 140 and the horizontal as at 107 to ensure purposeful movement.

When in the equilibrium position, the user-operable control device 10 will either cease signal transmission or send a signal to cease movement. In the preferred embodiment, the equilibrium position may prompt a movement stop signal as at 105 to the signal-transmitting/relaying mechanism as at dongle 13 or stand-alone module 70. When the user-operable control device 10 is manually oriented into a forward tilt position from equilibrium as generally depicted in FIG. 9, the tilt ball switch assembly 21 closes or the programmable g-sensor registers a purposeful movement thereby initiating an anterior or forward directional signal 101 for prompting a forward directional movement as at 111. In this case scenario, the virtual object 33 would correspondingly move with a forward directional movement 111 upon the electronic visual display 14.

Similarly, when the user-operable control device 10 is manually oriented into rearward, leftward, and rightward tilt positions from the equilibrium position as generally and respectively depicted in FIGS. 10, 12, and 13, the tilt ball switch assembly 21 closes or the programmable g-sensor registers a purposeful movement, and the user thereby initiates rearward, leftward, and/or rightward directional signals 102, 103, and/or 104 via the user-operable control device 10 for prompting rearward, leftward, and/or rightward directional movements as at 112, 113, and/or 114 respectively. In this case scenario, the virtual object 33 correspondingly moves with a rearward, leftward, or rightward directional movements 112, 113, and/or 114 upon the electronic visual display 14.

The reader will note the upright or vertical axis 106 of the user-operable control device 10 when in the equilibrium position, which axis 106 is orthogonal to the horizontal 107. Tilt positions cause the element 32 to move from a horizontal configuration into an angled orientation relative to the horizontal configuration thereby causing the spherical body 41 of an alternative tilt ball switch to roll within the current-conductive enclosure of the preferred tilt ball switch assembly 21 incorporated into the signal-transmitting circuitry or launcher mechanism 20 according to the present invention. Diagrammatic depictions of spherical body 41 movements within the current-conductive enclosure of the tilt ball switch assembly 21 are generally presented in FIGS. 8-13.

Figure 14:
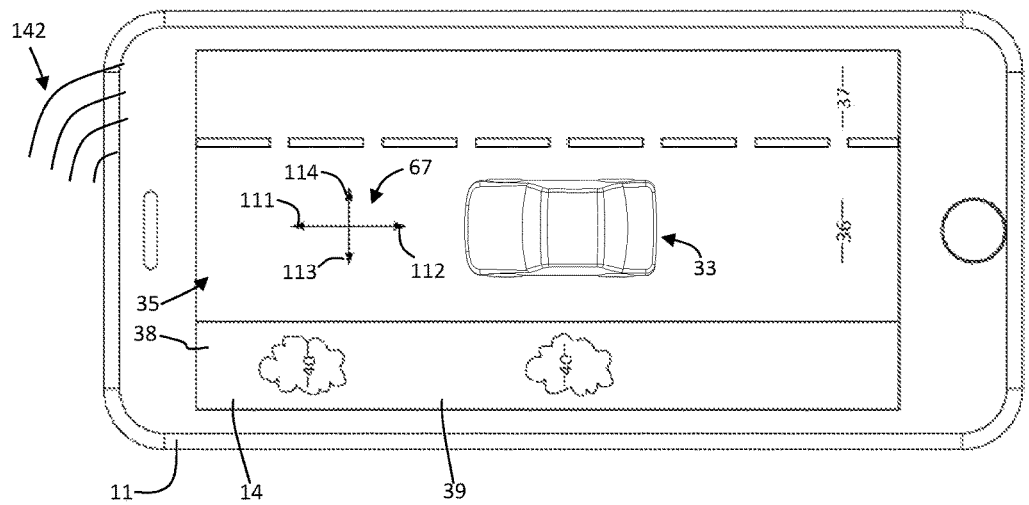
FIG. 14 is an enlarged depiction of a smart phone apparatus with a virtual gaming scenario depicted upon the visual display screen of the smart phone apparatus, the virtual gaming scenario including a car type virtual object controllable within a virtual gaming environment of the virtual gaming scenario via the toy car type user-operable control device according to the present invention.

The user-operable control device(s) 10 may further preferably comprise an optional feature switch for sending non-tilt-based signals to the user's communication device or computer 100 for effecting further functionality within the gaming environment such as virtual shots fired, virtual character jumping or virtual audio functionality (e.g. virtual car horn honking). In this regard, the reader will note a push button 54 mounted externally relative to the toy car 26 type user-operable control device 10, which push button 54 is in communication with the signal-transmitting circuitry or launch mechanism 20 for enabling the user to implement the optional added feature of functionality. When the push button 54 is depressed a signal may be sent for triggering the added feature as generally depicted at an audio "honk" tone as at 142 in FIG. 14.

The tilt ball switch assembly 21 according to the present invention may be alternatively preferred for its inexpensiveness and simple construction and is generally depicted in greater comparative detail in FIGS. 16-26A. As indicated, the tilt ball switch assembly 21 preferably comprises a current-conductive spherical body as at 41 and a current-conductive enclosure as at 42. The current-conductive spherical body 41 is rollably displaceable within the current-conductive enclosure 42 for effecting the primary directional movement signals exemplified by signals 101, 102, 103, and 104.

The current-conductive enclosure 42 preferably comprises a ball-supportive circuit board as at 32 and a ball-corralling shroud as at 43. The spherical body 41 is supported by the circuit board 32 and corralled by the ball-corralling shroud 43. Inner surface portions of the circuit board 32 and ball-corralling shroud 43 comprise conductive material portions for simultaneously and tangentially touching outer surfacing of the spherical body 41 for effecting the primary directional movement signals 101, 102, 103, and 104. Circuit board 32 comprises radially extending finger portions 44 outfitted with conductive surfacing and ball-corralling shroud 43 comprises orientation stopper formations 45 outfitted with conductive surfacing for closing circuitry via the conductive surfacing of spherical body 41 when tangentially touching and interconnecting the stopper formations 45 and finger portions 44.

Figure 26:
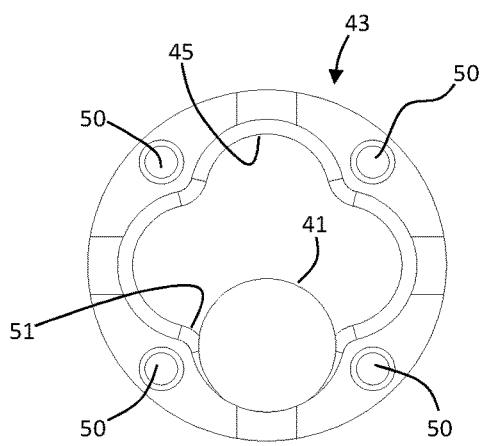
FIG. 26 is a horizontally transverse cross-sectional view of a first ball-corralling shroud of a current-conductive enclosure according to the present invention showing a spherical body received in a first orientation stopper formation.
Figure 26A:
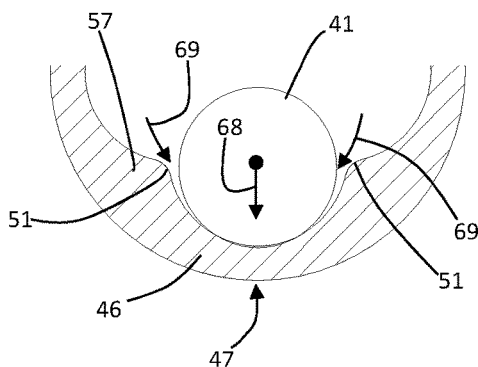
FIG. 26A is an enlarged, fragmentary sectional view as sectioned from FIG. 26 to show in greater detail the spherical body received in the first orientation stopper formation.

The stopper formations 45 of the ball-corralling shroud 43 preferably provide a series of body-receiving cradle formations 46 as more particularly illustrated in FIG. 26A. Each body-receiving cradle formation 46 is characterized by an arcuate transverse cross-section for receiving the spherical body 41 when directed therein and restricting lateral movement within the body-receiving cradle formations once received (via a corresponding tilt position) for enhancing the directional movement signals. In other words, when a user tilts the user-operable control device 10 into a chosen tilt position, the spherical body 41 enters the cradle formation 46 and slight lateral movements will not operate to displace the spherical body 41 from a corresponding signal-producing position since the arcuate transverse cross-section cradles the spherical body 41 and directs the spherical body 41 centrally as at center portion 47.

Figure 18:
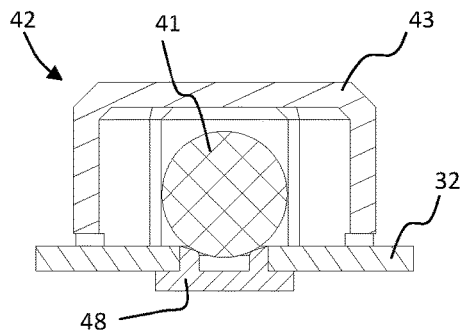
FIG. 18 is a vertically transverse cross-sectional view of an exemplary current-conductive enclosure of a tilt switch assembly according to the present invention showing an internal spherical body in a central equilibrium position.
Figure 19:
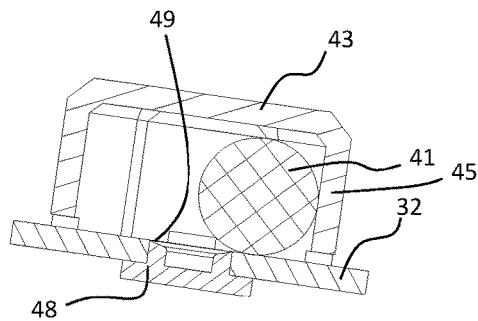
FIG. 19 is a vertically transverse cross-sectional view of an exemplary current-conductive enclosure of a tilt switch assembly according to the present invention showing an internal spherical body in a current conductive tilted position.
Figure 20:
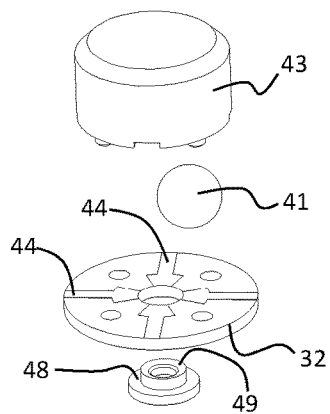
FIG. 20 is an exploded top perspective view of a first exemplary current-conductive enclosure of a tilt switch assembly according to the present invention showing from top to bottom a ball-corralling shroud, a spherical body, a printed circuit board element, and a non-conductive insert element.
Figure 21:
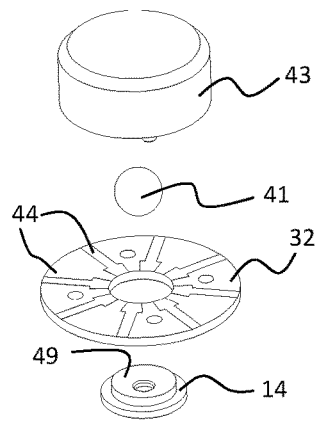
FIG. 21 is an exploded top perspective view of a second exemplary current-conductive enclosure of a tilt switch assembly according to the present invention showing from top to bottom a ball-corralling shroud, a spherical body, a printed circuit board element, and a non-conductive insert element.
Figure 22:
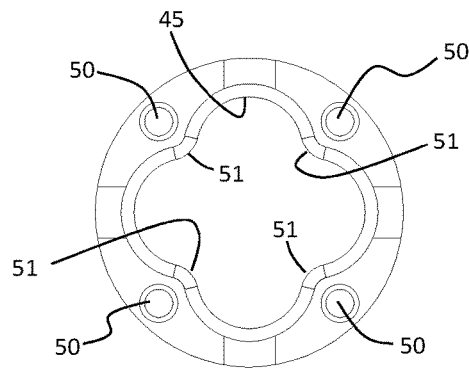
FIG. 22 is a horizontally transverse cross-sectional view of a first ball-corralling shroud of a current-conductive enclosure according to the present invention showing a first exemplary set of orientation stopper formations.
Figure 23:
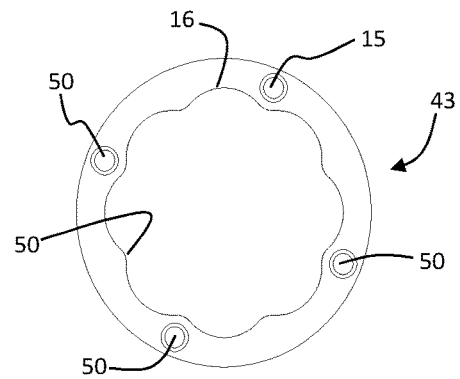
FIG. 23 is a horizontally transverse cross-sectional view of a second ball-corralling shroud of a current-conductive enclosure according to the present invention showing a second exemplary set of orientation stopper formations.
Figure 24:
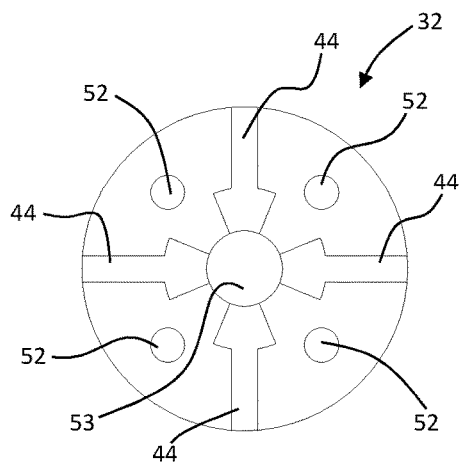
FIG. 24 is a plan view of a first printed circuit board of a current-conductive enclosure according to the present invention showing a first exemplary set of radially extending finger portions.
Figure 25:
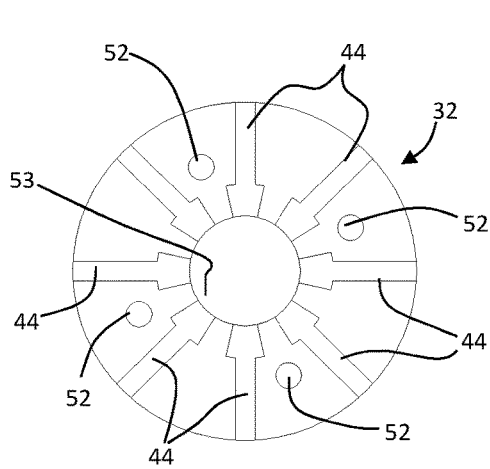
FIG. 25 is a plan view of a second printed circuit board of a current-conductive enclosure according to the present invention showing a second exemplary set of radially extending finger portions.

The current-conductive enclosure 42 may further preferably comprise a non-conductive insert element as at 48. The insert element 48 is upwardly concave at concave surfacing 49 for receiving the outer surfacing of spherical body 41. Accordingly, when the user-operable control device 10 is in the equilibrium position, the spherical body 41 may seat upon the concave surfacing 49 for retaining the equilibrium position of the spherical body 41 as generally depicted in FIG. 18. The insert element 48 is thus believed to enhance distinctions between signals initiated from current-conductive surfacing of the finger portions 44 and stopper formations 45 when the spherical body 41 is in a select tilt position versus the equilibrium position at horizontal.

The current-conductive enclosure 42 may further preferably comprise a series of position posts as at 50 and a series of non-conductive orientation divider portions as at 51 formed as part of the ball-corralling shroud 43. The circuit board 32 preferably comprises position post-receiving apertures 52 and a central insert-receiving aperture as at 53. The posts 50 are structurally positioned, sized and shaped for receipt in the position post-receiving apertures 52. The central insert-receiving aperture 53 is sized and shaped to receive the insert element 48. The divider portions structurally separate the conductive stopper portions 45 for enhancing signaling characteristics of the tilt ball switch assembly 21.

The foregoing specifications earlier suggested that any number of control signals could be implemented by the basic assemblies that cooperate to provide the user with the stated functionality. In this regard, it was further suggested that the preferred practice of the invention contemplated at least four primary directional signals as at 101, 102, 103, and 104 enabled via the signal-transmitting circuitry of the user-operable control device(s) 10. Referencing FIGS. 21, 23, and 25, the reader will there contemplate alternative current-conductive enclosure components 32 and 43 for enabling four secondary directional movement signals diagonally offset from the four primary directional movement signals.

In this last regard, the present invention contemplates providing the user with enhanced directional movements including movements diagonally offset from forward, rearward, leftward, and rightward directional movements 111, 112, 113, and 114 or directional movements that combine vectors in (a) the forward-leftward directions; (b) the forward-rightward directions; (c) the rearward-leftward directions; and (d) the rearward-rightward directions. Referencing FIG. 25, in particular, the reader will consider that the circuit board 32 may alternatively provide eight (8) finger portions 44, including four finger portions 44 in the 12:00, 3:00, 6:00, and 9:00 positions for effecting the four primary directional movements, and four finger portions 44 diagonally offset relative to the 12:00, 3:00, 6:00, and 9:00 positions for effecting diagonal movements.

The reader will further note that the wireless communications enabled via the signal-transmitting/relaying mechanism as at dongle 13 or stand-alone module 70 can be connected with at least four toys as at control devices 10 in the form of toy cars 26 objects at the same time for group play as illustrated in FIGS. 28A through 31D. Noting that a Bluetooth Low Energy or BLE feature of a typical communications device or computer 100 would allow a single toy to be connected for play, the present application thus enables group play, for example, by routing transmission signals via the signal-transmitting/relaying mechanism 70. Further, the current electronic design in each respective toy assigns every individual toy its own identification. Thus, no two toys will be treated as the same toy, even though many different individual toys will have the same or similar appearance (and treated as the same toy in the retail sense). This feature allows the gaming application server to store game play results and achievement levels for each individual toy on a cloud-based server, which can be retrieved when the toy is in play the next time or for online interactive gaming.

While the foregoing specifications set forth much specificity, the same should not be construed as setting forth limits to the invention but rather as setting forth certain preferred embodiments and features. The present invention basically contemplates three aspects of a central invention, including a gaming system, kit, and method for providing overlapping real-virtual world interactive play. The gaming system according to the present invention may be said to essentially and preferably comprise a computer as at 100, a user-operable control device as at 10, a signal-communicating mechanism as exemplified by signal-transmitting/relaying dongle 13 or stand-alone module as at 70, and a gaming application (embraced or denoted by APP icon 18) implementable by the computer 100.

Figure 5A:
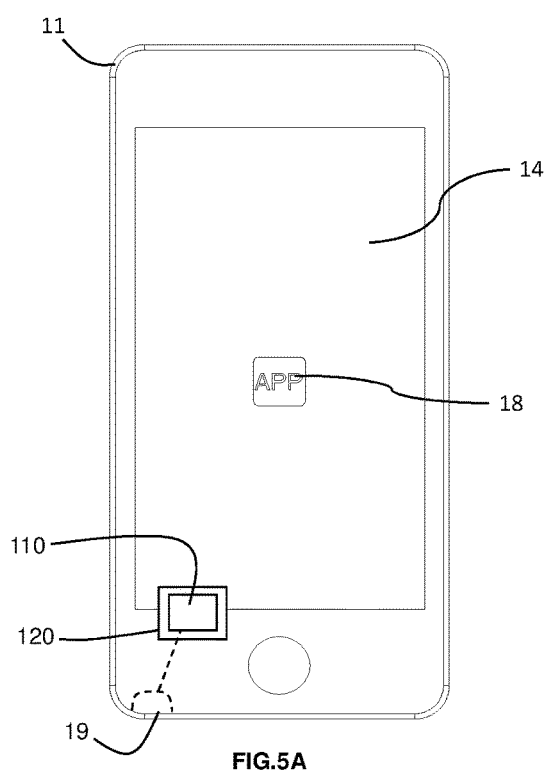
FIG. 5A is an enlarged depiction of a smart phone apparatus with parts broken away to show an internal processor component.
Figure 5B:
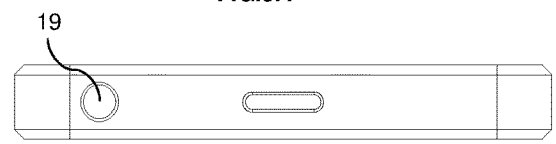
FIG. 5B is a bottom edge view of the smart phone apparatus otherwise depicted in FIG. 5A to highlight the earphone jack or interface of the smart phone apparatus.
Figure 6:
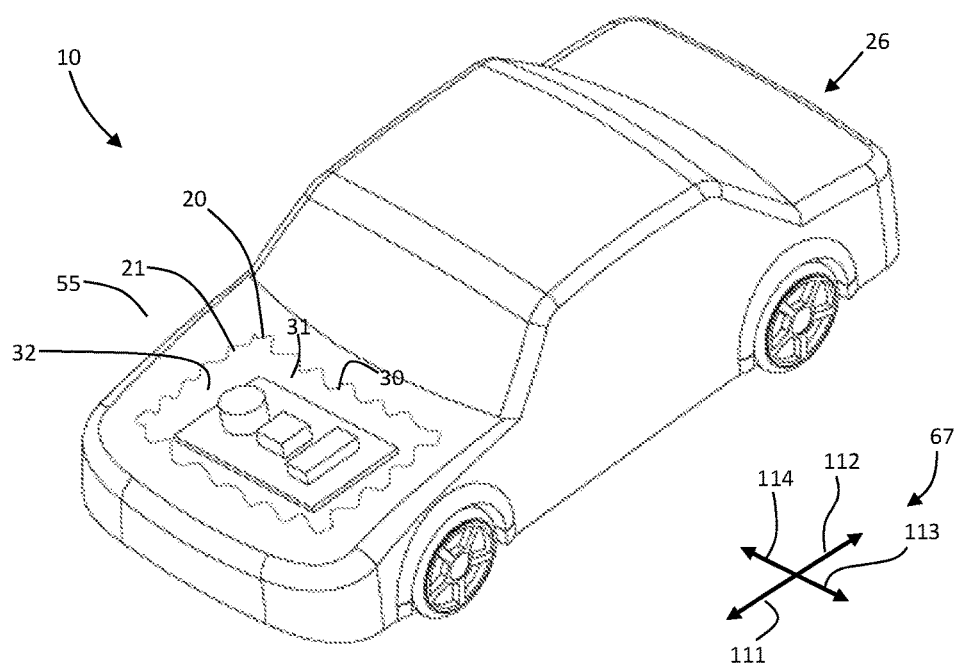
FIG. 6 is an enlarged top perspective view of a toy car type user-operable control device according to the present invention with parts broken away to show an otherwise hidden signal-transmitting launcher mechanism housed within a housing of the toy car type user-operable control device.
Figure 7:
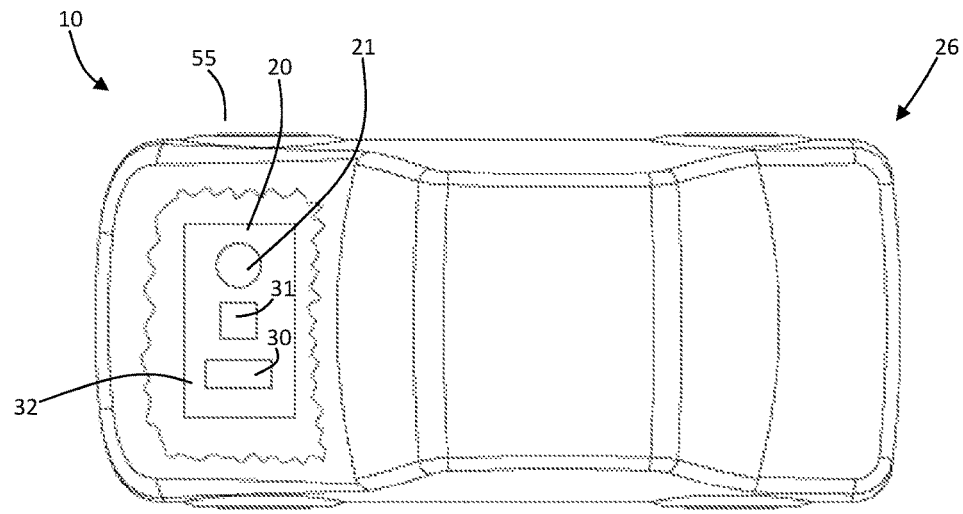
FIG. 7 is an enlarged top plan view of a toy car type user-operable control device according to the present invention with parts broken away to show an otherwise hidden signal-transmitting launcher mechanism housed within a housing of the toy car type user-operable control device.
Figure 8:
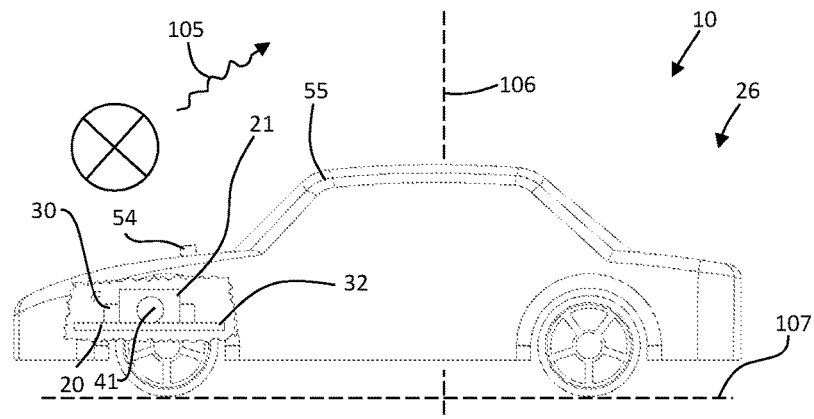
FIG. 8 is an enlarged lateral elevational view of a toy car type user-operable control device according to the present invention with parts broken away to show an otherwise hidden signal-transmitting launcher mechanism housed within a housing of the toy car type user-operable control device.

The computer preferably and essentially comprises a processor as depicted in a diagrammatic manner via broken away parts 120 and referenced at 110 in FIG. 5A and an electronic visual display 14 for enabling visual gaming. The user-operable control device 10 operates separate and apart from the computer 100 and preferably and essentially comprises circuitry housing 55 as illustratively exemplified by a toy car shape and appearance in FIGS. 6-13 and signal-generating/transmitting circuitry as typified by launch mechanism 20. The signal-generating/transmitting circuitry or launch mechanism 20 is housed within the circuitry housing 55 as generally depicted in FIGS. 6-13 and comprises a signal transmitter as diagrammatically depicted at component 30. The user-operable control device generates and transmits any number of virtual object movement control signals 15 (e.g. signals 101, 102, 103, and 104) enabled via the signal-generating/transmitting circuitry.

In a preferred deployment, the user-operable control device 10 is hand-operable as in the case of a toy car embodiment as at 26. The circuitry housing 55, for example, in the shape of a toy car 26, preferably comprises external contextual ornamentation reflective of the controllable and visually displayed virtual object 33 for enhancing the gaming experience. Further, certain portions of signal-generating/transmitting circuitry (e.g. the ball-supportive circuit board 32) are preferably mounted within the circuitry housing 55 so as to be orthogonal to an upright device axis as at 106 or parallel to the horizontal 107. The portions of the signal-transmitting circuitry are preferably so mounted for effecting an enhanced gaming experience via hand controllable movements of the circuitry housing relative to the upright device axis 106 or the horizontal 107.

It is contemplated that either a signal-communicating mechanism such as a signal-transmitting/relaying dongle 13 also be separately provided with the gaming system and made outfittable upon the computer via a component interface as exemplified by earphone jack 19, or a stand-along module 70 wirelessly communicable with both the control device(s) and the computer for effecting spatially separated or wireless communications. Alternatively, however, it is contemplated that the user-operable control device could be made wirelessly communicable directly with the computer 100 itself via wireless communications hardware pre-installed therewith and made communicable with the signal transmitter 30 for receiving the virtual object control signals 15 from the signal-transmitting circuitry and communicating the virtual object control signals to the processor 110 for further processing in connection with the gaming application.

The computer-implementable gaming application denoted by APP icon 18 is made operable via the processor 110 of the computer 100 and is thus deployable via the computer 100 for providing a controllable and visually displayed virtual object as at 33 upon the electronic visual display 14. The controllable and visually displayed virtual object 33 is virtually controllable in a virtual gaming environment as at 56 by way of the virtual object movement control signals 15 sent from the user-operable control device and communicated to the computer 100 via the signal-communicating mechanism exemplified by dongle 13 or module 70.

Recalling that certain portions of the signal-generating/transmitting circuitry are preferably and uniquely mounted within the circuitry housing 55, it should be noted that in a preferred alternative embodiment, the signal-generating/transmitting circuitry comprises a tilt switch, the tilt switch for generating the virtual object movement control signals 15 as exemplified by at least four primary directional signals 101, 102, 103, and 104. Further, the tilt switch may be preferably be defined by a ball bearing switch assembly as at 21, which assembly preferably further comprises a current-conductive spherical body as at 41 and a current-conductive enclosure as at 42. The current-conductive spherical body 51 is rollably displaceable within the current-conductive enclosure 42 for effecting the virtual object control signals 15.

The current-conductive enclosure 42 may preferably comprise the ball-supportive circuit board 32, as indicated, and a ball-corralling shroud as at 43. The spherical body or ball 41 is rollably supported by the ball-supportive circuit board 32 and corralled by the ball-corralling shroud 42. Inner surface portions of the ball-supportive circuit board 32 and ball-corralling shroud 43 comprises conductive material portions for simultaneously and tangentially touching outer surfacing of the spherical body 41 for generating the virtual object movement control signals 15.

The ball-corralling shroud 43 may preferably comprise a series of body-receiving cradle formations 46, each being characterized by comprising an arcuate transverse cross-section as generally and comparatively depicted in FIGS. 22, 23, 26, and 26A. The body-receiving cradle formations 46 basically function to receive the spherical body 41 when directed therein under a chosen tilt position of the circuitry housing 55 and restricting lateral movement of the spherical body 41 within the body-receiving cradle formation(s) 46 once received therein. Thus, the body-receiving cradle formations 46 effectively function to enhance the virtual object control signals by virtue of limitations on ball movement within the cradle portions 46.

The gaming kit according to the present invention is diagrammatically depicted in FIG. 27 and referenced at 60. There the reader will see a box type packaging construction 61 with parts thereof broken away as at 57 to show otherwise hidden kit components provided to the user upon purchase or delivery. The gaming kit 60 is usable in combination with a user's communications device or computer 100 for providing an overlapping real-virtual world interactive game.

The gaming kit 60 according to the present invention may be said to preferably and essentially comprise a user-operable control device 10 as illustratively exemplified by a toy car 26, a signal-communicating mechanism exemplified by a signal-transmitting/relaying dongle 13 or stand-along module 70, and gaming application access instructions as denoted in FIG. 27 by an enlarged APP icon 18. In this regard, it is contemplated that providing the user with instructions for accessing the downloadable gaming application is more cost effective than providing the user with a software-bearing transfer medium, although the latter is believed embraced by APP icon 18 in the context of FIG. 27.

In other words, the game access instructions may well instruct a user on how to access a downloadable software-based gaming application from an off-site location, which gaming application is implementable via the user's communications device or computer 100, which software-based game, once accessed, is deployable upon the user's communications device or computer 100 for providing a controllable and visually displayed virtual object as at 33 that is virtually controllable in the virtual gaming environment 56 by way of virtual object movement control signals 15 sent from the user-operable control device 10 and communicated to the user's communications device or computer 100 via the signal-communicating mechanism.

The gaming methodology according to the present invention enables communications device-based or computer-based play via a user-operable control device and may be said to comprise a series of steps generally and schematically depicted in FIG. 27. The gaming method according to the present invent ion may be said to comprise the initial step of providing the gaming kit 60 having at least a user-operable control device 10 (e.g. a toy car 26) and game access instructions as denoted by APP icon 18 contained therein. The electronic gaming application as denoted by APP icon 18 may then be accessed and downloaded to a user's communications device or computer 100 via the game access instructions. FIG. 27 depicts a smartphone 11 with an APP icon 18 denoted thereon in the second position 62.

Once the gaming application is installed on the user's communication device or computer 100, the electronic gaming application may be initiated or launched for providing an electronic game upon. The electronic game provides a controllable and visually displayed virtual object as at 33 within a virtual gaming environment as at 56. The user's communications device or computer 100 may then be outfitted with a signal-communicating mechanism (e.g. signal-communicating dongle 13 at a signal-communication interface (e.g. earphone jack 19) or made communicable with the control devices via a stand-alone signal-communicating mechanism or directly therewith. Virtual object movement control signals 15 may be transmitted to the user's communications device or computer via the signal-communicating mechanisms 13 or 70. Outfitting the smartphone 11 with an alternative dongle 13 is generally depicted at position 63 in FIG. 27.

The step of transmitting virtual object movement control signals to the user's communications device or computer 100 via the user-operable control device 10 exemplified by a toy car 26 is generally depicted at position 64 in FIG. 27. The step of communicating the virtual object movement control signals 15 to the electronic gaming application via the user's communications device or computer 100 is generally depicted in position 65 at vector arrow 66. The controllable and visually displayed virtual object 33 within the virtual gaming environment 56 may thus be controlled as symbolized by vector cross 67 via the virtual object movement control signals 15 transmitted from the user-operable control device 10.

Though not specifically illustrated, it is contemplated that the foregoing specifications well support a gaming method inclusive of or dependent upon certain signal-generating/transmitting circuitry comprising either a g-sensor or a ball switch assembly, which latter assembly has a current-conductive spherical body and a current-conductive enclosure, In this regard, it is contemplated the gaming method comprises the step of rollably displacing the spherical body within the current-conductive enclosure for effecting the virtual object control signals. Further, the gaming method contemplates a current-conductive enclosure having a ball-supportive circuit board and ball-corralling shroud whereby inner surface portions of the ball-supportive circuit board and ball-corralling shroud comprise conductive material portions.

Thus, the gaming method according to the present invention may be said to comprise the further optional or alternative steps of supporting the spherical body by the ball-supportive circuit board; corralling the spherical body by the ball-corralling shroud; and simultaneously tangentially touching outer surfacing of the spherical body via the inner surface portions of the ball-supportive circuit board and ball-corralling shroud for effecting the virtual object control signals. Further, the methodology contemplates the step of mounting the ball-supportive circuit board within the circuitry housing orthogonally relative to an upright device axis 106 for effecting an enhanced gaming experience via hand controllable movements of the circuitry housing 56 relative to the upright device axis.

Finally, noting that the ball-corralling shroud 43 comprises a series of body-receiving cradle formations as at 46 characterized by an arcuate transverse cross-section, the gaming method according to the present invention may be said to alternatively comprise the steps of receiving the spherical body 41 in at least one body-receiving cradle formation 46, and restricting lateral movements of the received spherical body 41 within the body-receiving cradle formation 46 once received therein. In this regard, it is noted that the spherical body 41 inherently comprises some mass as depicted at vector arrow 68 in FIG. 26A. The mass 68 is directed toward the cradle formation 46 when in a select tilt position and the opposed arcuate surfacing directs (as at vectors 69) the spherical body 41 centrally as at position 47.

Accordingly, although the invention has been described by reference to certain preferred and alternative embodiments, it is not intended that the novel arrangements be limited thereby, but that modifications thereof are intended to be included as falling within the broad scope and spirit of the foregoing disclosures, the appended drawings submitted in support of these specifications, and the following claims.

What is claimed is:

1. A gaming system for providing overlapping real-virtual world interactive play, the gaming system comprising:
    a computer, the computer comprising a processor and an electronic visual display for enabling visualized gaming;
    at least one user-operable control device separate from the computer, the at least one user-operable control device comprising an externally ornamental housing and signal-transmitting circuitry, the at least one user-operable control device for generating and transmitting virtual object control signals enabled via the signal-transmitting circuitry;
    the signal-transmitting circuitry comprising a tilt sensor, the tilt sensor for sensing tilt angles of the at least one user-operable control device relative to a reference plane, the tilt sensor for aiding in the generation of the virtual object control signals reflective of the tilt angles, the tilt sensor being defined by an accelerometer, the accelerometer being programmable for aiding in the generation of the virtual object control signals and sensing critical tilt angles, the critical tilt angles being in excess of a select device angle selected from a tilt angle range of 25-35 degrees from the reference plane, the tilt angle range for enhancing transmission of the virtual object control signals;
    a signal-communicating mechanism communicable with the signal-transmitting circuitry for communicating the virtual object control signals to the processor; and
    a computer-implementable gaming application made operable via the processor of the computer, the gaming application being deployable via the computer for providing at least one controllable and visually displayed virtual object upon the electronic visual display, the at least one controllable and visually displayed virtual object being virtually controllable in a virtual gaming environment by way of the virtual object control signals sent from the at least one user-operable control device and communicated to the computer via the signal-communicating mechanism.

2. The gaming system of claim 1 wherein the signal-communicating mechanism is a stand-alone module for communicating signals from the signal-transmitting circuitry to the computer.

3. The gaming system of claim 2 wherein a plurality of user-operable control devices are simultaneously operable to generate and transmit virtual object control signals, the signal-communicating mechanism being operable to simultaneously communicate signals from the plurality of user-operable control devices to the computer for enabling overlapping real-virtual world interactive group play upon the computer.

4. The gaming system of claim 1 wherein the accelerometer enables the creation of primary directional virtual object control signals, the primary directional virtual object control signals comprising forward, rearward, left lateral and right lateral virtual object control signals.

5. The gaming system of claim 4 wherein the accelerometer enables the creation of combination directional virtual object control signals, the combination directional virtual object control signals comprising forward-left, rearward-left, forward-right, and rearward-right virtual object control signals, the forward-left, rearward-left, forward-right, and rearward-right virtual object control signals being base on resultant vector combinations of the primary directional virtual object control signals.

6. A gaming kit usable in combination with a user's communications device for providing an overlapping real-virtual world interactive game, the gaming kit comprising:
    at least one user-operable control device, the at least one user-operable control device comprising an externally ornamental housing and signal-transmitting circuitry, the signal-transmitting circuitry comprising a tilt sensor, the user-operable control device for governing at least four primary directional movements, the at least four primary directional movements for generating virtual object control signals enabled via the tilt sensor of the signal-transmitting circuitry;
    the tilt sensor being defined by an accelerometer, the accelerometer being programmable for aiding in the generation of the virtual object control signals and sensing critical tilt angles, the critical tilt angles being in excess of select device angles as selected from a tilt angle range of 25-35 degrees from a reference plane, the tilt angle range for enhancing transmission of the virtual object control signals;
    a signal-communicating mechanism communicable with the signal-transmitting circuitry for communicating the virtual object control signals to the user's communications device; and
    game access instructions for instructing a user on how to access a gaming application implementable via the user's communications device, the gaming application, once accessed, being deployable upon the user's communications device for providing at least one controllable and visually displayed virtual object, the at least one controllable and visually displayed virtual object being virtually controllable in a virtual gaming environment by way of the virtual object control signals sent from the at least one user-operable control device and communicated to the user's communications device via the signal-communicating mechanism.

7. The gaming kit of claim 6 wherein the signal-communicating mechanism is a stand-alone module for communicating signals from the signal-transmitting circuitry to the user's communications device.

8. The gaming kit of claim 7 wherein a plurality of user-operable control devices are simultaneously operable to generate and transmit virtual object control signals, the signal-communicating mechanism being operable to simultaneously communicate signals from the plurality of user-operable control devices to the user's communications device for enabling overlapping real-virtual world interactive group play upon the user's communications device.

9. The gaming kit of claim 8 wherein the accelerometer enables the creation of primary directional virtual object control signals, the primary directional virtual object control signals comprising forward, rearward, left lateral and right lateral virtual object control signals.

10. The gaming kit of claim 9 wherein the accelerometer enables the creation of combination directional virtual object control signals, the combination directional virtual object control signals comprising forward-left, rearward-left, forward-right, and rearward-right virtual object control signals, the forward-left, rearward-left, forward-right, and rearward-right virtual object control signals being base on resultant vector combinations of the primary directional virtual object control signals.

11. A gaming method for enabling computer-based play via at least one user-operable control device, the gaming method comprising the steps of:

providing a gaming kit, the gaming kit comprising the at least one user-operable control device and game access instructions, the at least one user-operable control device comprising an externally ornamental housing and signal-transmitting circuitry, the signal-transmitting circuitry comprising an accelerometer, the at least one user-operable control device for generating and transmitting virtual object control signals;

the accelerometer being programmed to sense critical tilt angles, the critical tilt angles being in excess of select device angles as selected from a tilt angle range of 25-35 degrees from a reference plane, the tilt angle range for enhancing transmission of the virtual object control signals;

accessing an electronic gaming application via the game access instructions upon a user's computer;

initiating the electronic gaming application via the user's computer for providing an electronic game thereupon, the electronic game providing at least one controllable and visually displayed virtual object within a virtual gaming environment;

transmitting virtual object control signals to the user's computer via the at least one user-operable control device;

communicating the virtual object control signals to the electronic gaming application via the user's computer; and controlling the at least one controllable and visually displayed virtual object within the virtual gaming environment via the virtual object control signals transmitted from the at least one user-operable control device.

12. The gaming method of claim 11 comprising the step of hand-controlling the at least one user-operable control device, the externally ornamental housing being reflective of a contextually relevant object, the contextually relevant object being reflective of the at least one controllable and visually displayed virtual object for enhancing the gaming experience.

13. The gaming method of claim 11 wherein the virtual object control signals are communicated to the electronic gaming application via the user's computer and a signal-communicating mechanism, the signal-communicating mechanism being a stand-alone module.

14. The gaming method of claim 13 wherein a plurality of user-operable control devices are simultaneously operable to generate and transmit virtual object control signals, the signal-communicating mechanism being operable to simultaneously communicate signals from the plurality of user-operable control devices to the user's computer for enabling overlapping real-virtual world interactive group play upon the user's computer.

15. The gaming method of claim 11 wherein the accelerometer enables the creation of primary and combination directional virtual object control signals, the primary directional virtual object control signals comprising forward, rearward, left lateral and right lateral virtual object control signals, the combination directional virtual object control signals comprising forward-left, rearward-left, forward-right, and rearward-right virtual object control signals, the forward-left, rearward-left, forward-right, and rearward-right virtual object control signals being base on resultant vector combinations of the primary directional virtual object control signals.

* * * * *